United States Patent
Loewe et al.

(10) Patent No.: US 10,752,178 B2
(45) Date of Patent: Aug. 25, 2020

(54) MOTOR VEHICLE HAVING A LOAD COMPARTMENT COVER

(71) Applicant: FORD GLOBAL TECHNOLOGIES, LLC, Dearborn, MI (US)

(72) Inventors: Thomas Loewe, Buchen (DE);
Christoph Fuss, Erfstadt (DE);
Christian Causemann, Cologne (DE);
Frank Schneider, Iserlohn (DE);
Sascha Kaatz, Langenfeld (DE);
Matthias Baumann, Aachen (DE)

(73) Assignee: Ford Global Technologies, LLC, Dearborn, MI (US)

(*) Notice: Subject to any disclaimer, the term of this patent is extended or adjusted under 35 U.S.C. 154(b) by 31 days.

(21) Appl. No.: 16/254,547

(22) Filed: Jan. 22, 2019

(65) Prior Publication Data
US 2019/0225158 A1 Jul. 25, 2019

(30) Foreign Application Priority Data
Jan. 22, 2018 (DE) .......... 10 2018 200 940

(51) Int. Cl.
*B60R 5/04* (2006.01)
(52) U.S. Cl.
CPC .................. *B60R 5/044* (2013.01)
(58) Field of Classification Search
CPC ........... B60R 5/04; B60R 5/044; B60R 5/045; B60R 2011/0024; B60R 2011/0036
USPC ........................... 296/24.43–24.45
See application file for complete search history.

(56) References Cited

U.S. PATENT DOCUMENTS

| 3,181,911 A | * | 5/1965 | Peras | B60J 5/101 296/37.1 |
| 4,073,534 A | * | 2/1978 | Hira | B60R 5/044 296/37.16 |
| 4,202,578 A | * | 5/1980 | Roullier | B60R 5/044 296/106 |
| 4,357,046 A | | 11/1982 | Lalanne | |

(Continued)

FOREIGN PATENT DOCUMENTS

| DE | 19604214 A1 | 8/1996 |
| DE | 102012210964 A1 | 1/2013 |

(Continued)

OTHER PUBLICATIONS

English Machine Translation of EP0028184A1 dated May 6, 1981.
(Continued)

*Primary Examiner* — Gregory A Blankenship
(74) *Attorney, Agent, or Firm* — David Coppiellie; King & Schickli, PLLC

(57) ABSTRACT

A motor vehicle includes a tailgate that is upwardly pivotable in a rearward upward manner and on which a load compartment cover is pivotably held around a pivot axis by way of the rear end region of the load compartment cover that faces the tailgate. The load compartment cover, in a region that is spaced apart from the pivot axis by way of at least one force transmission element, is held on a vehicle body. The force transmission element, when the tailgate is upwardly pivoted, pivots the load compartment cover toward the tailgate so as to expose an access to the load compartment. At least one hook connection connects the tailgate to the load compartment cover and establishes the pivot axis.

11 Claims, 15 Drawing Sheets

(56) References Cited

U.S. PATENT DOCUMENTS

| | | | | | |
|---|---|---|---|---|---|
| 4,479,675 | A | * | 10/1984 | Zankl | B60R 5/044 16/230 |
| 4,728,141 | A | * | 3/1988 | Motozawa | B60R 5/044 242/373 |
| 6,394,002 | B1 | * | 5/2002 | Blanchard | B60R 5/044 108/44 |
| 8,172,296 | B2 | * | 5/2012 | Umeda | B60R 5/045 296/24.43 |
| 8,528,957 | B2 | | 9/2013 | Ugalde et al. | |
| 2011/0241372 | A1 | * | 10/2011 | Kusu | B60R 5/048 296/24.43 |
| 2013/0020825 | A1 | * | 1/2013 | Yamada | B60R 5/044 296/37.16 |
| 2015/0375682 | A1 | * | 12/2015 | Matsubara | B60R 5/044 296/24.44 |
| 2016/0264058 | A1 | * | 9/2016 | Kishimoto | B60R 5/044 |
| 2017/0144607 | A1 | * | 5/2017 | Utsunomiya | B60R 5/045 |
| 2018/0297531 | A1 | * | 10/2018 | Baumann | B60R 5/045 |
| 2019/0084484 | A1 | * | 3/2019 | Herman | B60R 5/04 |
| 2019/0210534 | A1 | * | 7/2019 | Causemann | B60R 5/044 |
| 2019/0225158 | A1 | * | 7/2019 | Loewe | B60R 5/044 |

FOREIGN PATENT DOCUMENTS

| | | | | |
|---|---|---|---|---|
| DE | 102014224887 | A1 | | 6/2016 |
| DE | 202015005733 | U1 | | 12/2016 |
| DE | 102018121604 | | * | 3/2019 ............ B60R 5/045 |
| EP | 0028184 | A1 | | 5/1981 |
| EP | 2138353 | A1 | | 12/2009 |
| FR | 2565176 | A1 | | 12/1985 |
| FR | 2819459 | A1 | | 7/2002 |
| JP | 2003002120 | A | | 1/2003 |
| JP | 2013035380 | A | | 2/2013 |
| WO | 9729929 | A1 | | 8/1997 |

OTHER PUBLICATIONS

English Machine Translation of FR2565176A1 dated Dec. 6, 1985.
English Machine Translation of EP2138353A1 dated Dec. 30, 2009.
English Machine Translation of WO9729929A1 dated Aug. 21, 1997.
Office Action dated Jun. 19, 2019 for U.S. Appl. No. 15/936,853, filed Mar. 27, 2018.
English Machine Translation of DE102014224887A1 dated Jun. 9, 2016.
English Machine Translation of DE19604214A1 dated Aug. 22, 1996.
English Machine Translation of DE202015005733U1 dated Dec. 22, 2016.
English Machine Translation of FR2819459A1 dated Jul. 19, 2002.
English Machine Translation of JP2003002120A dated Jan. 8, 2003.
English Machine Translation of JP2013035380A dated Feb. 21, 2013.
English Machine Translation of DE102012210964A1 dated Jan. 3, 2013.
Wildsau; "Wildsau's Wheelhaus: 2014 Audi SQ5"; http://wildsau.ca/2013/11/wildsaus-wheelhaus-2014-audi-sq5-review/; Nov. 3, 2013.
Search Report for EP18160714.4 dated Jan. 6, 2018.

* cited by examiner

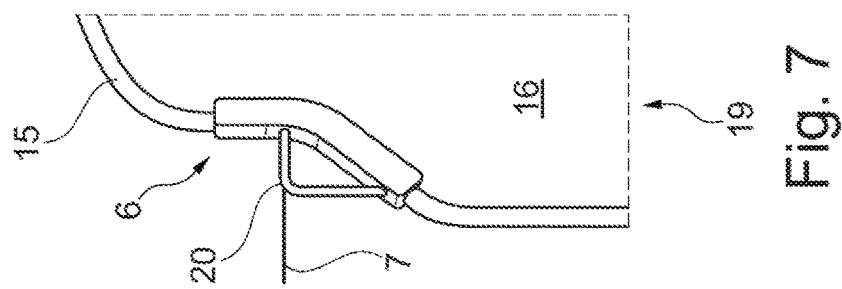
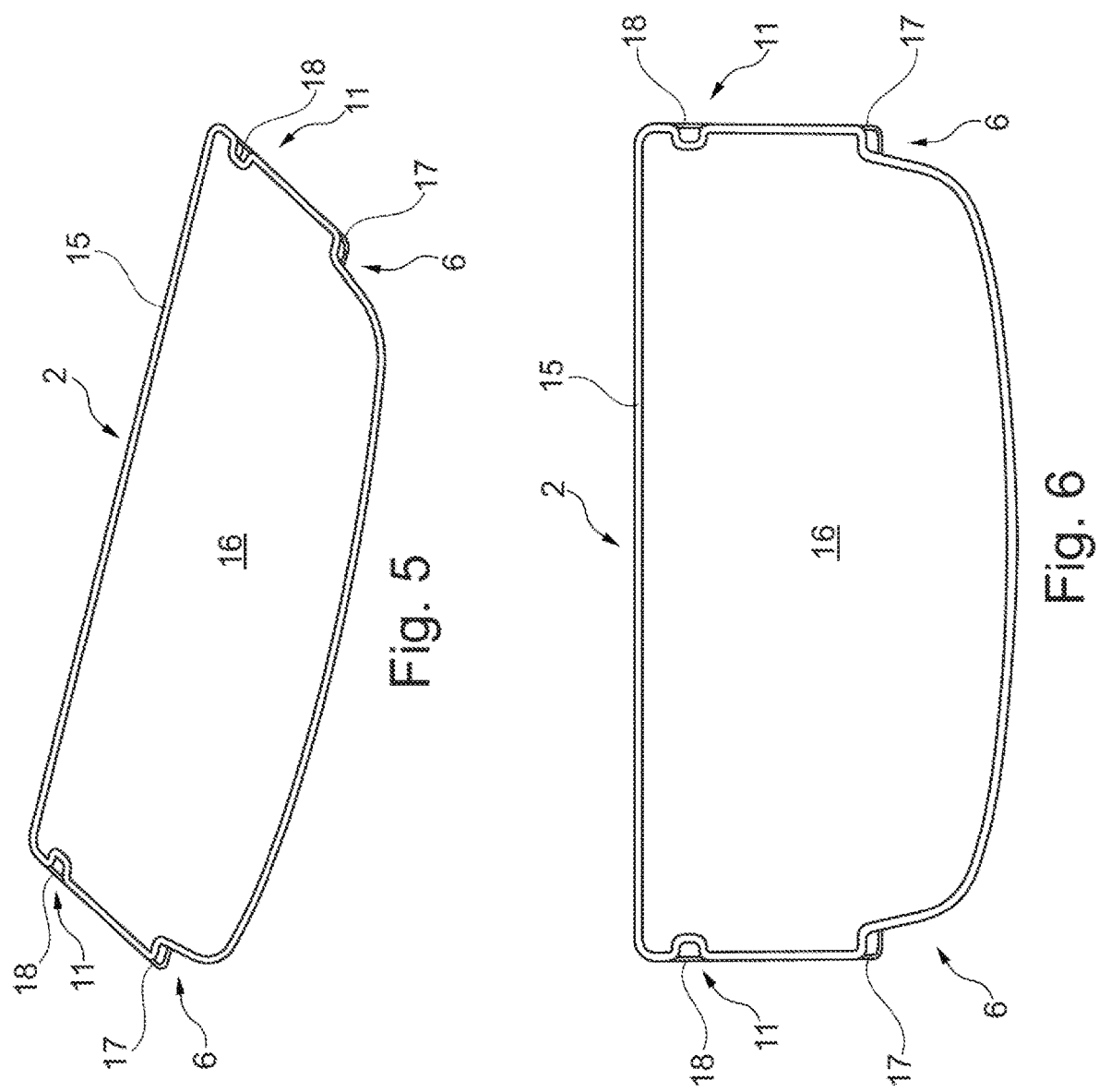

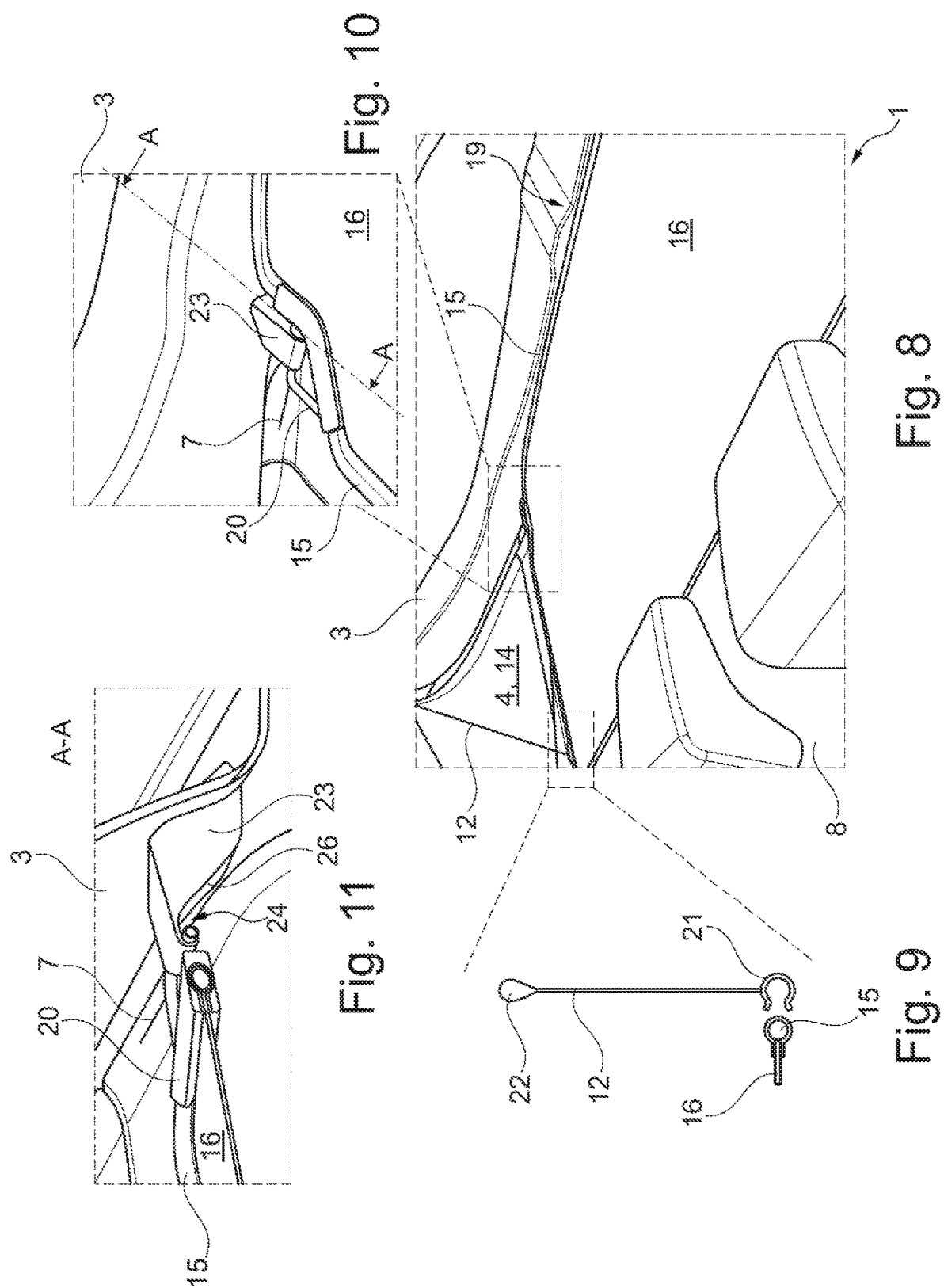

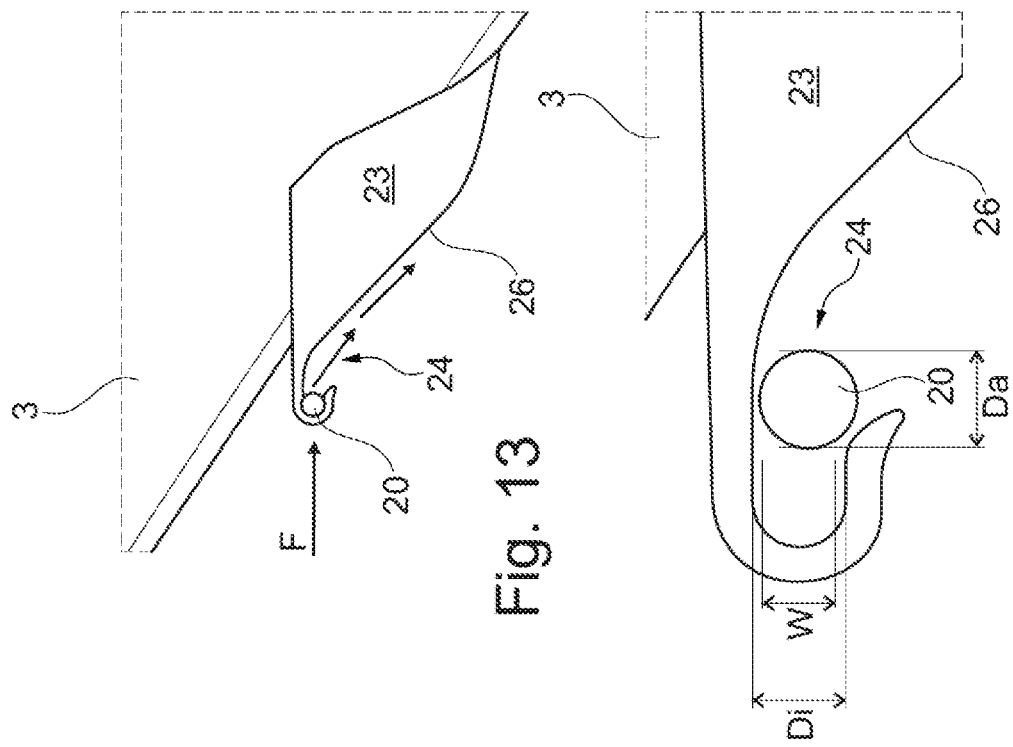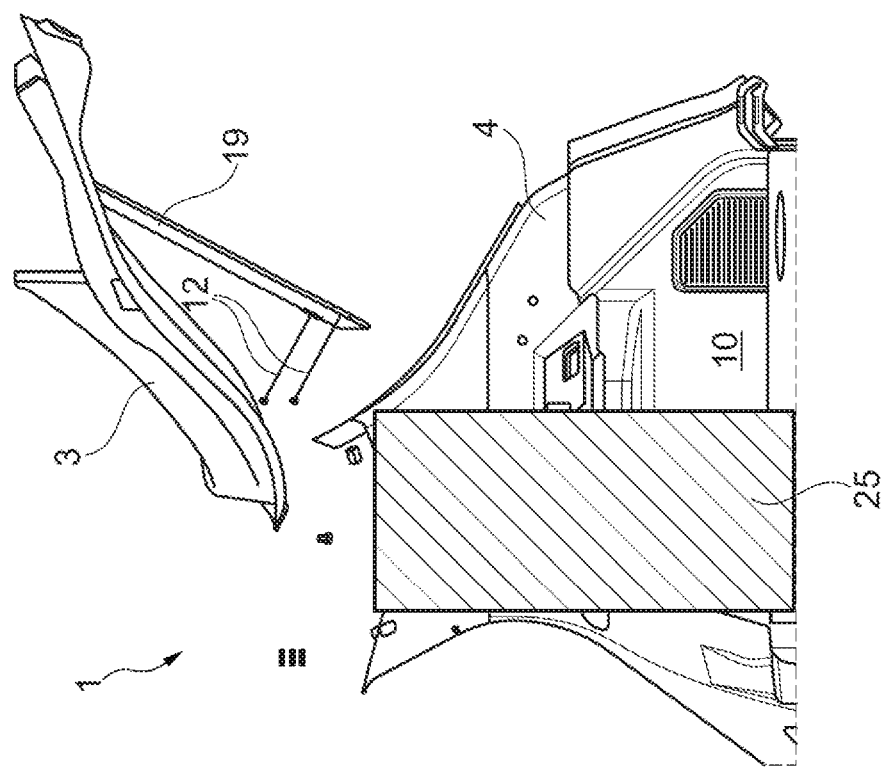

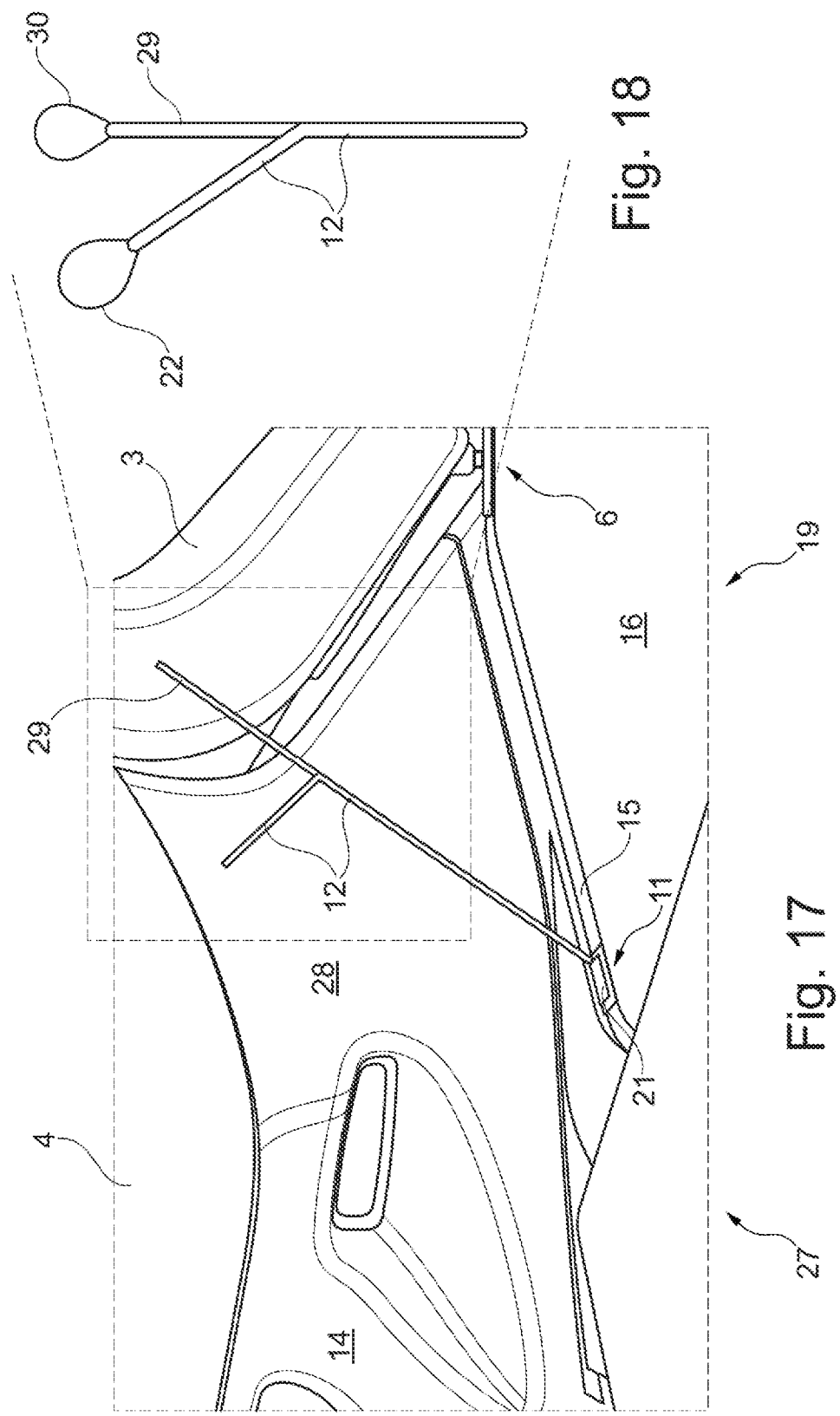

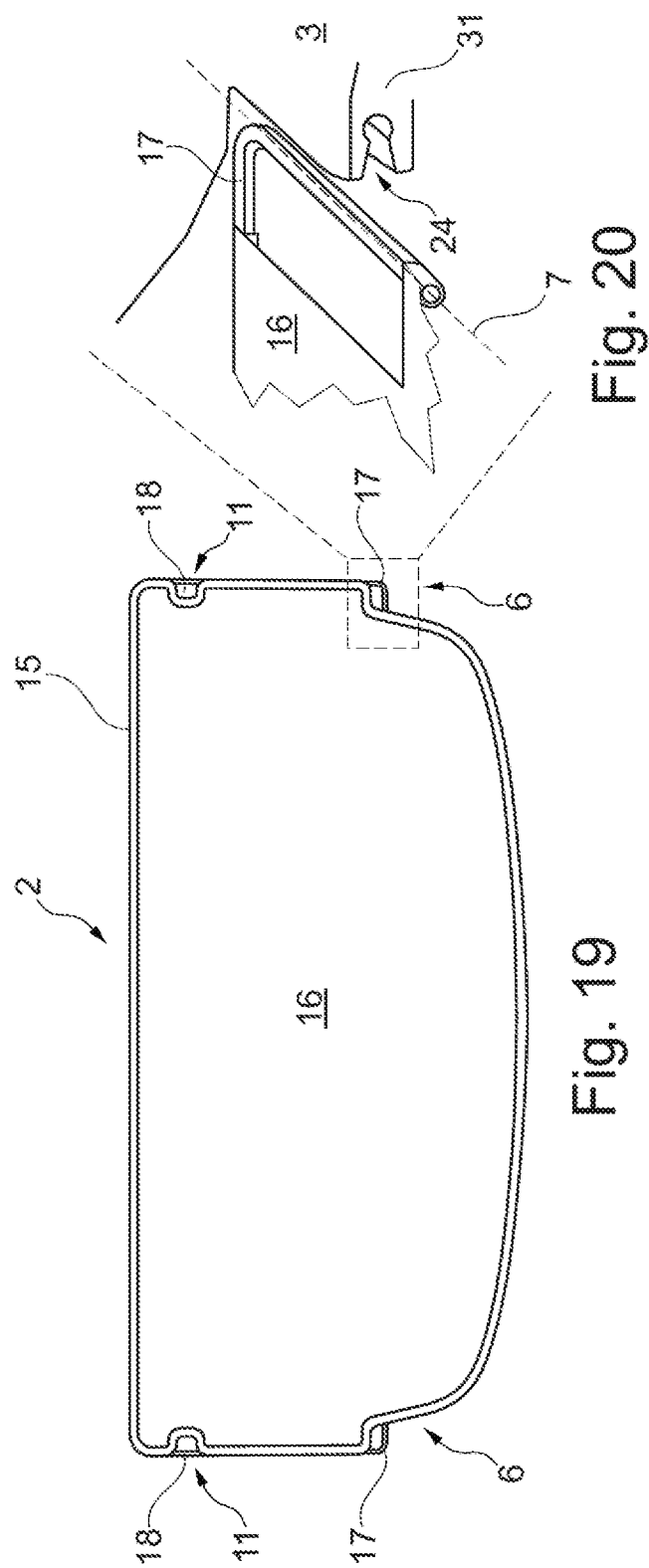
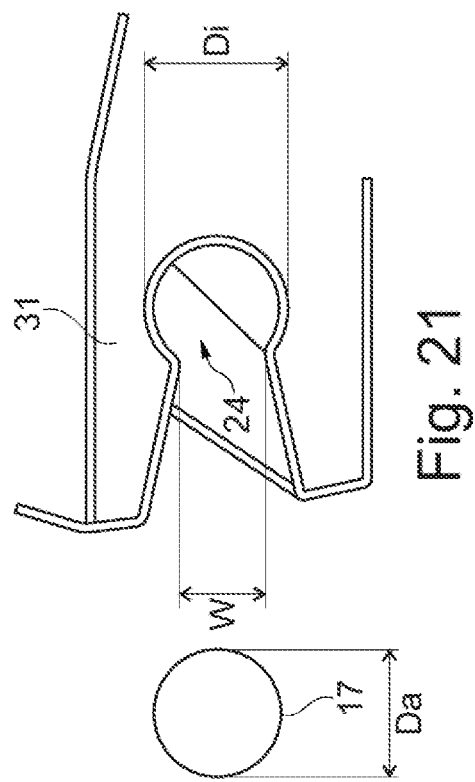

MOTOR VEHICLE HAVING A LOAD COMPARTMENT COVER

TECHNICAL FIELD

This document relates to a motor vehicle having a load compartment cover.

BACKGROUND

Load compartment covers for motor vehicles for covering a load compartment that lies behind a seat and is located within a passenger cabin are generally known. Load compartment covers of this type, in the case of a closed tailgate, offer a visual protection such that the interior of the load compartment cannot be seen from the outside, on the one hand, and are likewise pivotable simultaneously with the upward pivoting of the tailgate so as to expose the access to the load compartment once opened. On the other hand, in the case of an opened tailgate objects can be placed in the load compartment or can be retrieved therefrom without parts of the load compartment cover having to be manually removed or moved away. Moreover, a closed load compartment cover advantageously minimizes the transmission of undesirable noises from the load compartment, or from the rear region of the motor vehicle, respectively, to the passenger cabin and thus improves the NVH (noise, vibration, harshness) properties of said motor vehicle.

Load compartment covers of this type, by way of the front end region thereof, are usually mounted so as to be pivotable on the vehicle body, for example on lateral parts of the load compartment in the region of an upper edge of a rearward seat backrest. By way of the rear end region of said load compartment, covers are connected to the tailgate by one tape or traction cable that is attached on each side of the load compartment cover such that the tailgate, when upwardly pivoted in a rearward upward manner, likewise pivots the load compartment cover in an upward manner so as to on account thereof expose the access to the load compartment. Load compartment covers of this type for motor vehicles are disclosed, for example, in DE 10 2014 224 887 A1 and U.S. Pat. No. 8,528,957 B2 (also DE 10 2012 210 964 A1).

A variant of a load compartment cover for a motor vehicle that is very similar to the above is furthermore shown in U.S. Pat. No. 8,172,296 B2, wherein the load compartment cover here is additionally split into a front cover portion and a rear cover portion so as to enlarge the access region to the load compartment of the motor vehicle and, on account thereof, to simplify the introduction and retrieval of comparatively large objects into or out of the load compartment, respectively. The front cover portion of the load compartment cover is attached to the motor vehicle as has been described above. By contrast, the rear cover portion is fixedly connected to the tailgate such that said rear cover portion is completely moved conjointly with the tailgate and only in the closed state of the tailgate is contiguous to the front cover portion of the load compartment cover in such a manner that both portions form a single flat horizontal face.

A load compartment cover that in relation to a tailgate of a motor vehicle is rigidly connected to said tailgate is furthermore shown in JP 2003-2120 A. The load compartment cover is formed by a frame that erects a net. The fastening of the load compartment cover to the tailgate provides on each vehicle side of the tailgate in each case one stay which extends downward and is attached to the inside of the tailgate and has a free end that is configured in the shape of a hook. The free end is capable of releasably engaging in a clearance that is configured in a lateral part on the lower side of the frame of the load compartment cover. Pins which can be introduced into corresponding clearances of the tailgate are provided on the rearward part of the frame. In order for the load compartment cover to be released from the tailgate, the frame of the load compartment cover can be lifted out of the hooks of the lateral stays, and the pins can subsequently be pulled out of the receptacles of the tailgate.

A mechanism for the pivotable fastening of a load compartment cover for a motor vehicle to a tailgate of the motor vehicle in which the load compartment cover on an end portion that faces the tailgate of the motor vehicle is held so as to be pivotable on a pivot axis on the tailgate and at a forward portion is held on the vehicle body is shown, for example, in DE 196 04 214 A1, JP 2013-35380 A, and FR 2 819 459 A1. The load compartment cover, in the closed state of the tailgate, covers a load compartment of the motor vehicle that lies behind a vehicle seat and is located within a passenger cabin. When upwardly pivoting the tailgate in a rearward upward manner, the load compartment cover is likewise pivoted in a rearward upward manner so as to expose an access to the load compartment. In order for the load compartment cover in the opened state of the tailgate as a result of gravity not to hang vertically downward and not to impede the access to the load compartment, said load compartment cover, on account of the linkage at the front and on the vehicle body, is drawn at a certain angle counter to the vertical direction in the direction of the passenger cabin so as to enlarge the access region to the load compartment.

To this end, DE 196 04 214 A1 provides a force transmission means in the form of a rubber band which is elastic in the longitudinal extent of said force transmission means and which at one end is fastened to the vehicle body, in particular to the vehicle floor, and at the other end is fastened to the front portion of the load compartment cover. In order for the opening angle of the load compartment cover to be further enlarged, the rubber band along the profile thereof between the vehicle floor and the load compartment cover is deflected on a deflection means that is fastened to a rear side of a vehicle seat.

In the case of JP 2013-35380 A, the front portion of the load compartment cover, by means of force transmission means in the shape of cables, is fastened to a roof structure of the vehicle body. The force transmission means, in the case of an opened tailgate, pulls the front portion of the load compartment cover in the direction of the roof structure. The force transmission cables can be hooked into eyelets that are provided in the roof structure.

FR 2 819 459 A1 proposes that a cable-type force transmission means is fastened to the front portion of the load compartment cover and to a lateral wall portion of a vehicle body, wherein the force transmission cable is deflected on a loop-type deflection means that is fastened to the tailgate. The force transmission cable runs through said deflection means and said force transmission means, depending on the opening state of the tailgate being able to slide through said deflection means so as to pull the load compartment cover in the direction of the tailgate in the completely opened state of the tailgate. The pivotable linkage of the rearward portion of the load compartment cover provides a hook-and-eyelet connection, wherein a hook-shaped holding means, which runs in an arcuate manner and is fastened to the tailgate, engages in an opening of an eyelet that is provided on the load compartment cover. The eyelet opening during an upward pivoting movement of the tailgate first slides along the arcuate hook portion so as to enable a pivoting of the load compartment cover relative to the tailgate, so as to finally impact on a terminal detent of the hook that forms a form-fit with the eyelet in the case of a completely opened tailgate. In order for the hook-and-eyelet connection to be separated in a non-destructive manner, the front fastening of the load compartment cover on the vehicle body is released first, so as to be able to manually pivot the load compartment cover to a vertical position in the opened state of the tailgate, in which vertical position the eyelet can be pushed over and beyond the terminal detent of the hook.

SUMMARY

Against this background, it is an objective to provide a motor vehicle having a load compartment cover for a load compartment that lies behind a seat of the motor vehicle and is located within a passenger cabin, wherein the motor vehicle in the case of an opened tailgate provides a largest possible access to the load compartment so as to facilitate the introduction and the retrieval of even large objects into or from the load compartment, respectively. Moreover, oversized objects that are introduced into the load compartment are to be protected from any damage on account of the load compartment cover, in particular when the access to the load compartment is closed. Moreover, the mechanism for exposing and closing the access to the load compartment is to have a construction which is simple and thus producible in a cost-effective manner.

This object is achieved by a motor vehicle having the features of the following claims.

It is to be pointed out that the features which are individually listed in the description hereunder can be combined with one another in any arbitrary and technically purposeful manner and can demonstrate further design embodiments of the motor vehicle. The description additionally characterizes and specifies the motor vehicle in particular in conjunction with the figures.

Accordingly, a motor vehicle has a tailgate which is upwardly pivotable in a rearward upward manner and on which a load compartment cover is pivotably held around a pivot axis by way of the rear end region of said load compartment cover that faces the tailgate. In order for the tailgate to be upwardly pivotable in a rearward upward manner, said tailgate at the upper end region thereof can be fastened in a known manner to a vehicle body, for example to the vehicle roof, so as to be pivotable about a vehicle transverse axis.

The load compartment cover in a region that is spaced apart from the pivot axis by way of at least one force transmission means is furthermore held on a vehicle body. The force transmission means, when the tailgate is upwardly pivoted, pivots the load compartment cover toward the tailgate so as to expose an access to the load compartment. Furthermore, at least one hook connection which connects the tailgate to the load compartment cover and which establishes the pivot axis is provided. The hook connection has a hook-shaped holding means and a counter holding means that is capable of engaging in said hook-shaped holding means. It is to be understood that to this end either the hook-shaped holding means is fastened to the tailgate and the counter holding means is fastened to the tailgate-side end region of the load compartment cover, or the hook-shaped holding means is fastened to the tailgate-side end region of the load compartment cover and the counter holding means is fastened to the tailgate.

A hook-shaped holding means is to be understood as any means (hereunder for the sake of simplicity also referred to as a hook) which is configured so as to be substantially U-shaped, J-shaped, or L-shaped, thus is accordingly shaped so as to be curved and/or curved in an angular manner. However, the hook-shaped holding means in terms of the circumference is not configured so as to be completely closed such as, for example a ring, but has a circumferential interruption which serves for introducing the counter holding means into the hook and optionally for said counter holding means to be removed from said hook again, in order for the hook connection to be released in a non-destructive manner.

A counter holding means in this context is to be understood to be any means which in terms of at least one effective direction of a force engaging on the counter holding means is suitable for establishing a releasable form-fitting connection with the hook-shaped holding means. A force of this kind may be a tensile force acting between the hook and the counter holding means, for example. Accordingly, the counter holding means can be configured, for example, as a circumferentially completely closed ring or eyelet. However, the counter holding means can also be configured so as to be hook-shaped as has been defined above, or else ping-shaped.

The hook connection is configured in such a manner that the hook-shaped holding means, in a upward pivoting movement of the tailgate, holds the counter holding means in a form-fitting manner. In a downward pivoting movement of the tailgate that is counter to the upward pivoting movement, beyond a force of a predeterminable size which is counter to the downward pivoting movement and which acts on the load compartment cover, the hook-shaped holding means releases the counter holding means in a non-destructive manner.

The form-fitting holding of the counter holding means by the hook in the upward pivoting of the tailgate in a rearward upward manner ensures that the load compartment cover is likewise moved conjointly with the tailgate in a rearward upward manner. The linkage of the region of the load compartment cover that is spaced apart from the pivot axis to the vehicle body by way of the force transmission means causes a pivoting of the load compartment cover toward the tailgate. This serves to enlarge the access to the load compartment of the motor vehicle is enlarged.

In the downward pivoting movement of the tailgate that is counter to the upward pivoting movement, that is to say in a closing procedure of the tailgate, the gravity acting on the load compartment cover can be advantageously utilized for moving the load compartment cover to the position thereof provided for covering the load compartment in the case of a completely closed tailgate. In this way, the interior of the load compartment cannot be seen from the outside in the case of a closed tailgate.

However, should an oversized object be located in the load compartment, that is to say an object of which the height protrudes beyond the originally provided vertical position of the load compartment cover in the closed state of the tailgate, the load compartment cover in the downward pivoting movement of the tailgate, for example by way of the front edge of said load compartment cover, will contact the oversized object such that the latter confronts a movement of the load compartment cover that follows the downward pivoting movement of the tailgate and impedes or blocks, respectively, said movement of the load compartment cover. Consequently, the load compartment cover in the further course of the closing movement of the tailgate can be jammed between the object and the tailgate, as a result of which the oversized object in the load compartment of the motor vehicle could be damaged by the compressive force exerted by the tailgate on the load compartment cover. However, this is effectively prevented by the present design, since the hook connection, as a result of the counterforce that is exerted by the oversized object on the load compartment cover and which is counter to the compressive force that is exerted by the tailgate on the load compartment cover, is released in a non-destructive manner such that the rear end region of the load compartment cover that faces the tailgate is no longer connected to the tailgate after the hook connection has been released, and said end region in the further course of the closing movement of the tailgate can freely move relative to the tailgate, for example can slide along the internal side of said tailgate.

The hook connection disclosed above can particularly advantageously also be utilized for manually releasing the end region of the load compartment cover that faces the tailgate from the tailgate. For example, in the case of an opened tailgate, a force (counter force) that is counter to the normal downward pivoting movement of the load compartment cover is manually exerted on the load compartment cover and, on account thereof, the non-destructive release of the hook connection, that is to say the release of the counter holding means from the hook-shaped holding means, is achieved.

The mechanism for pivoting the load compartment cover for exposing and closing the load compartment access so as to depend on an upward pivoting angle of the tailgate advantageously has a construction that is very simple and cost-effective to produce. This is true since the load compartment cover is capable of being pivotably fastened to the tailgate by way of a simple hook connection, on the one hand, and only the force transmission means that holds the region of the load compartment cover that is spaced apart from the pivot axis is provided between the vehicle body and the load compartment cover, on the other hand.

According to one advantageous design embodiment, the hook-shaped holding means has a friction face which is spaced apart from an internal side of the tailgate. The counter holding means after the release thereof by the hook-shaped holding means slides and is guided along said friction face. This enables a targeted movement of the end region of the load compartment cover that faces the tailgate relative to the tailgate in the case described above in which an unexpected counterforce that is counter to the downward pivoting movement acts on the load compartment cover by way of a specific variable during the downward pivoting movement of the tailgate. The friction face which is spaced apart from the internal side of the tailgate significantly reduces the possibility of the end region of the load compartment cover that faces the tailgate in the movement of said end region relative to the tailgate engaging, for example, in a form-fitting manner with an element or component of the tailgate that projects from the internal side of the tailgate. The latter potentially leads to a sizeable, potentially damaging force acting from the tailgate by way of the load compartment cover on the oversized object.

According to one further advantageous design embodiment, the hook-shaped holding means on the inside has a holding face having an Ω-shaped (omega-shaped) contour which in regions circumferentially surrounds an external side of the counter holding means that is engaged with the hook-shaped holding means. As has already been explained above, the hook-shaped holding means circumferentially is not completely closed but has a circumferential interruption by way of which the counter holding means can be brought to engage with the hook. In the context of the present design an Ω-shaped contour of the holding face on the inside of the hook-shaped holding means is to be understood as such a contour which circumferentially surrounds the external side of the counter holding means that is engaged with the hook-shaped holding means by way of a circumferential angle of more than 180 degrees and less than 360 degrees. Accordingly, the direct spacing of the two free circumferential ends of the hook holding face which delimit the circumferential interruption of the hook-shaped holding means, herein also referred to as the opening width, is smaller than the internal diameter of the contour of the inside holding face.

If an external diameter of the counter holding means that engages with the hook-shaped holding means is chosen such that said external diameter is larger than the opening width of the hook-shaped holding means and as large as or smaller than the internal diameter of the hook holding face contour, a specific resistance force has thus to be overcome in order for the counter holding means to be introduced into the hook so as to push the counter holding means through the opening width of the hook which is smaller than the external diameter of said counter holding means. The same applies for the reverse process i.e. when releasing the counter holding means from the hook-shaped holding means. It is to be understood that the hook-shaped holding means, in particular in the region of the circumferential ends of the hook holding face, must have a certain elasticity in order for the hook connection to be established and released in a non-destructive way. This elasticity permits an at least brief, non-destructive, elastic widening of the opening width in order for the counter holding means to be passed through.

The design embodiment described above offers the advantage that a hook connection between the hook-shaped holding means and the counter holding means received by the latter, once established, can only be released by overcoming a specific resistance force. Thus, a secure, stable mounting of the load compartment cover on the tailgate is guaranteed under normal operating conditions. Further, the hook connection is released only in the case of an extraordinarily high force acting on the hook connection, such as can arise, for example, in the case of an oversized object in the load compartment as set forth above, said extraordinarily high force corresponds to at least the resistance force required for releasing the counter holding means from the hook.

One even further advantageous design embodiment of the invention provides that a largest internal diameter of the holding face on the inside of the hook-shaped holding means has a size which corresponds to at least the size of an external diameter of the external side of the counter holding means that is capable of being engaged with the hook-shaped holding means. This ensures a smooth-running pivoting capability of the counter holding means in the hook-shaped holding means by way of minor friction losses.

One further advantageous design embodiment provides that the linkage of the force transmission means to the vehicle body is performed on a vehicle pillar that is ahead of the tailgate, in particular a vehicle pillar that is directly ahead of the tailgate, such as, for example, a C-pillar or D-pillar. In this way, the force transmission means can be routed on a direct path to the load compartment cover, that is to say without any deflection. This significantly simplifies the construction.

According to one further advantageous design embodiment which is implementable in a particularly simple manner, the force transmission means is a traction cable or traction belt and the like, which transmits holding forces or tensile forces, respectively, between the load compartment cover and the vehicle body. The force transmission means can thus advantageously be conceived for transmitting only tensile forces. This yet again substantially simplifies the construction of the motor vehicle having the load compartment cover, since the force transmission means is to be conceived only for the transmission of tensile forces and not additionally also for the transmission of thrust forces. The pivoting of the load compartment cover for exposing the access to the load compartment during the upward pivoting of the tailgate to the opening position thereof can thus be performed by way of a tensile force that is transmitted by the force transmission means between the vehicle body and the load compartment cover. In contrast, the return pivoting of the load compartment cover for closing the access to the load compartment during the downward pivoting of the tailgate to the closed position thereof can be performed with the aid of the gravity acting on the load compartment cover. This construction can be implemented by way of simple cost-effective means.

In order for a defined pivoting movement of the load compartment cover that is at all times consistent to be achieved in the upward pivoting of the tailgate, said pivoting movement moreover leading to a largest possible opening of the load compartment access after the complete upward pivoting of the tailgate, the force transmission means in the force transmission direction can be substantially non-elastic, or inelastic, respectively.

According to yet one further advantageous design embodiment, the force transmission means is deflected on a force deflection means that is attached to the tailgate. This is to be understood that the effective direction of the force of the force transmission means by way of the force deflection means is changed from a first direction to a second direction that is different from the first direction. On account thereof it is achieved that the load compartment cover in the upward pivoting of the tailgate is pivoted even further toward the tailgate and is held so as to be substantially parallel to the tailgate after the tailgate has been upwardly pivoted. The size of the access to the load compartment in this case is now only determined by the opening angle of the tailgate, since no region of the load compartment cover is any longer disposed so as to reduce the size of the access region to the load compartment once the tailgate has been completely upwardly pivoted. The load compartment cover in the closed state of the tailgate completely closes the access to the load compartment in a conventional manner, such that the interior of the load compartment cannot be seen from the outside in the case of a closed tailgate. In the case of an opened tailgate, the design thus provides a largest possible access to the load compartment such that the introduction and retrieval of even large objects into or from the load compartment, respectively, is substantially facilitated.

In a further particularly simple and advantageous design embodiment, the force deflection means is an eyelet, a deflection roller, or a deflection traction cable. The force deflection means is disposed on, or attached to, respectively, the tailgate and deflects the effective force direction predefined by the force transmission means, for example a traction cable, in that the force transmission means is routed, for example, through the eyelet or by way of the deflection roller, or by the deflection traction cable is held in a specific direction that is oblique or transverse to the original force transmission direction of the force transmission means.

In the case of a deflection traction cable, the latter can have a motionally fixed connection to the force transmission means. The motionally-fixed connection does not permit any relative movement between the force transmission means and the force deflection means, such that no friction, or friction forces, respectively, arises/arise between the force transmission means and the force deflection means during the upward and downward pivoting movement of the tailgate. Moreover, the force deflection of the force transmission means by means of the deflection traction cable fixedly connected thereto represents a solution which is implementable in a particularly cost-effective manner. This motionally-fixed connection can be, for example, a plug connection, a clamp connection, a clip connection, or a stitch connection, or else be established by way of a materially integral connection technology, for example by adhesive bonding.

Particularly preferably, on each vehicle side of the load compartment cover in each case one force transmission means that is linked thereto is provided. The force transmission means in the case of force deflection means being present, is deflected by way of a force deflection means that is attached laterally to the tailgate. In the case of this design embodiment, a total of two force transmission means, and optionally two force deflection means, which in the vehicle transverse direction in each case are disposed on both sides of the load compartment cover and thus ensure a uniform pivoting movement of the load compartment cover in the upward and downward pivoting of the tailgate without the load compartment cover herein being canted or twisted, are thus provided.

The region of the load compartment cover that is spaced apart from the pivot axis and to which the force transmission means is linked on the load compartment cover can be a front end region of the load compartment cover. The front end region herein can be, for example, approximately ⅓ or less of the longitudinal extent of the load compartment cover in the vehicle longitudinal direction. In other embodiments, the front end region can be approximately ¼ or in still other embodiments approximately ⅕ of the total longitudinal extent of the load compartment cover in the vehicle longitudinal direction. In this way, as a result of the relatively large spacing between the pivot axis of the load compartment cover on the tailgate and the linkage point of the force transmission means on the load compartment cover in the front end region thereof, by virtue of the large leverage, only a minor effort in force is required in order for the load compartment cover to be pulled to the tailgate when the latter is being upwardly pivoted. Accordingly, the force transmission means can be conceived for transmitting a minor force and thus can be designed in a particularly simple manner.

Moreover, by way of the choice of the linkage point of the force transmission means on the load compartment cover at the front end region thereof, in the case of the presence of the force deflection means, the spacing between the force deflection means that is disposed on the tailgate and the linkage point of the force transmission means on the load compartment cover can advantageously be established. This may be done in such a manner that said spacing corresponds approximately to the pivoting distance of the force deflection means that is attached to the tailgate in the upward pivoting of the tailgate to the fully opened position thereof. As a result, the load compartment cover after the upward pivoting is held so as to be substantially completely parallel with the tailgate. Additionally, the disposal of the force deflection means along the tailgate can also be chosen in a manner analogous to the establishment of the previously mentioned spacing.

Furthermore, an even further simplification of the motor vehicle body is achievable in that the force transmission means and the optionally present force deflection means are/is disposed in the passenger cabin and thus are/is also accessible from the latter. Said force transmission means and said force deflection means can thus be readily replaced without great complexity, for example in the case of maintenance. The disposal of the force transmission means, for example on or along, respectively, an internal side of the vehicle body that surrounds the passenger cabin is also possible in a simple manner and without great complexity. A temporary disassembly of the load compartment cover, for example for the transportation of particularly large objects, is also capable of being readily carried out in this way.

The load compartment cover may be releasably fastened to the tailgate by way of the hook connection. It is particularly advantageous for the force transmission means to also be releasably fastened to the load compartment cover and/or to be releasably fastened to the vehicle body. For example, the force transmission means can be suspended from the load compartment cover and/or the vehicle body, or be hooked thereto, clip-fitted thereto, and the like. The load compartment cover can thus be completely removed from the passenger cabin of the motor vehicle when required.

According to a further aspect, a motor vehicle has a tailgate which is upwardly pivotable in a rearward upward manner. A load compartment cover is pivotably connected to the tailgate at a pivot axis located at a rear end region of said load compartment cover that faces the tailgate. In order for the tailgate to be upwardly pivotable in a rearward upward manner, said tailgate at the upper end region thereof can be fastened in a known manner to a vehicle body, for example to the vehicle roof, so as to be pivotable about a vehicle transverse axis.

The load compartment cover in a region that is spaced apart from the pivot axis by way of at least one force transmission means is furthermore held on a vehicle body, wherein the force transmission means, when the tailgate is upwardly pivoted, pivot the load compartment cover toward the tailgate so as to expose an access to the load compartment. The force transmission means is deflected on a force deflection means that is attached to the tailgate. This is to be understood toward that the effective force direction of the force transmission means by way of the force deflection means is changed from a first direction to a second direction that is different from the first direction. The force transmission means may be a traction cable, and the force deflection means may be a deflection traction cable that is fastened to the force transmission means and runs obliquely or transversely to the force transmission means.

It is achieved on account thereof that the load compartment cover in the upward pivoting of the tailgate is pulled to the tailgate and after the upward pivoting of the tailgate is held so as to be substantially parallel with the tailgate. The size of the access to the load compartment in this case is now only determined by the opening angle of the tailgate, since no region of the load compartment cover is any longer disposed so as to reduce the size of the access region to the load compartment once the tailgate has been completely upwardly pivoted. The load compartment cover in the closed state of the tailgate completely closes the access to the load compartment in a conventional manner, such that the interior of the load compartment cannot be seen from the outside in the case of a closed tailgate. In the case of an opened tailgate, the load compartment cover thus provides a largest possible access to the load compartment such that the introduction and retrieval of even large objects into or from the load compartment, respectively, is substantially facilitated.

The pivoting mechanism of the load compartment cover for releasing and closing the access to the load compartment can have a construction which is very simple and producible in a cost-effective manner. This is possible since the load compartment cover is only to be pivotably fastened to the tailgate, on the one hand, and the force transmission means, deflected by way of the force deflection means attached to the tailgate, is disposed between the vehicle body and the load compartment cover, so as to provide a connection that holds the load compartment cover on the vehicle body.

The deflection traction cable can be fastened to the force transmission means by way of a motionally-fixed connection. That motionally-fixed connection does not permit any relative movement between the force transmission means and the force deflection means, such that no friction, or friction forces, respectively, arises/arise between the force transmission means and the force deflection means during the upward and downward pivoting movement of the tailgate. Moreover, the force deflection of the force transmission means by means of the deflection traction cable fixedly connected thereto represents a solution which is implementable in a particularly cost-effective manner. This motionally-fixed connection can be, for example, a plug connection, a clamp connection, a clip connection, or a stitch connection, or else be established by way of a materially integral connection technology, for example by adhesive bonding.

The force transmission means may be configured as a traction cable or traction belt, respectively, and the force deflection means may be configured as a deflection traction cable or deflection traction belt, respectively. Both the force transmission means as well as the force deflection means are accordingly conceived for transmitting only tensile forces. This substantially simplifies the construction of the motor vehicle having the load compartment cover, since the force transmission means as well as the force deflection means are to be conceived for the transmission of only tensile forces and not additionally also for the transmission of thrust forces. The pivoting of the load compartment cover for exposing the access to the load compartment during the upward pivoting of the tailgate to the opening position thereof can thus be performed by way of a tensile force that is transmitted by the force transmission means between the vehicle body and the load compartment cover and by a tensile force that is transmitted by the force deflection means between the tailgate and the force transmission means. In contrast, the return pivoting of the load compartment cover for closing the access to the load compartment during the downward pivoting of the tailgate to the closed position thereof can be performed with the aid of gravity acting on the load compartment cover. This construction can be implemented by way of simple cost-effective means.

In order for a defined pivoting movement of the load compartment cover that is at all times consistent to be achieved in the upward pivoting of the tailgate, said pivoting movement moreover leading to a largest possible opening of the load compartment access after the complete upward pivoting of the tailgate, one advantageous design embodiment provides that the force transmission means and/or the force deflection means in the respective force transmission direction are/is substantially non-elastic or inelastic, respectively.

According to one advantageous design embodiment, the region of the load compartment cover that is spaced apart from the pivot axis and to which the force transmission means is linked on the load compartment cover can be a front end region of the load compartment cover. The front end region herein can be, for example, approximately ⅓ or less of the longitudinal extent of the load compartment cover in the vehicle longitudinal direction, preferably, for example, approximately ¼ and particularly preferably approximately ⅕ of the total longitudinal extent of the load compartment cover in the vehicle longitudinal direction. In this way, as a result of the relatively large spacing between the pivot axis of the load compartment cover on the tailgate and the linkage point of the force transmission means on the load compartment cover in the front end region thereof, by virtue of the large leverage only a minor effort in force is required in order for the load compartment cover to be pulled to the tailgate when the latter is being upwardly pivoted. Accordingly, the force transmission means can be conceived for transmitting a minor force and thus can be designed in a particularly simple manner.

One further advantageous design embodiment provides that the linkage of the force transmission means to the vehicle body is performed on a vehicle pillar that is ahead of the tailgate, in particular a vehicle pillar that is directly ahead of the tailgate, such as, for example, a C-pillar or D-pillar. In this way, the force transmission means can be routed on a direct path to the force deflection means, without further force deflection means having to be provided for guiding the force transmission means from the linkage point thereof on the vehicle body to the force deflection means on the tailgate. This significantly simplifies the construction.

According to one further advantageous design embodiment, an even further simplification of the motor vehicle body is provided in that the force transmission means and the force deflection means are disposed in the passenger cabin and are thus also accessible from the latter. Said force transmission means and said force deflection means can thus be readily replaced without great complexity, for example in the case of maintenance. The disposal of the force transmission means, for example on or along, respectively, an internal side of the vehicle body that surrounds the passenger cabin is also possible in a simple manner and without great complexity. A temporary disassembly of the load compartment cover, for example for the transportation of particularly large objects, is also capable of being readily carried out in this way.

According to yet one further advantageous design embodiment, on each vehicle side of the load compartment cover in each case one force transmission means that is linked thereto is provided. Such a force transmission means in each case is deflected by way of a force deflection means that is attached laterally to the tailgate. In the case of this design embodiment, a total of two force transmission means and two force deflection means, which in the vehicle transverse direction in each case are disposed on both sides of the load compartment cover and thus ensure a uniform pivoting movement of the load compartment cover in the upward and downward pivoting of the tailgate without the load compartment cover herein being canted or twisted, are thus provided.

According to one further advantageous design embodiment, the load compartment cover is releasably fastened to the tailgate. The force transmission means is releasably fastened to the load compartment cover and/or releasably fastened to the vehicle body. The force deflection means is releasably fastened to the tailgate and/or releasably fastened to the force transmission means. The load compartment cover can thus be completely removed from the passenger cabin of the motor vehicle when required.

One even further advantageous design embodiment provides that at least one hook connection connects the tailgate to the load compartment cover and establishes the pivot axis. That hook connection has a hook or hook-shaped holding means and a hook receiver or counter holding means that is capable of engaging in said hook-shaped holding means. It is to be understood that to this end either the hook-shaped holding means is fastened to the tailgate and the counter holding means is fastened to the end region of the load compartment cover, or the hook-shaped holding means is fastened to the end region of the load compartment cover and the counter holding means is fastened to the tailgate.

A hook or hook-shaped holding means in the context of the present design is to be understood as any means (hereunder for the sake of simplicity also referred to as a hook) which is configured so as to be substantially U-shaped, J-shaped, or L-shaped, thus is accordingly shaped so as to be curved and/or curved in an angular manner. However, the hook-shaped holding means in terms of the circumference is not configured so as to be completely closed such as, for example a ring, but has a circumferential interruption which serves for introducing the counter holding means into the hook and optionally for said counter holding means to be removed from said hook again, in order for the hook connection to be released in a non-destructive manner.

A hook receiver or counter holding means in the context of the present design is to be understood to be any means which in terms of at least one effective direction of a force engaging on the counter holding means is suitable for establishing a releasable form-fitting connection with the hook-shaped holding means. A force of this kind may be a tensile force acting between the hook and the counter holding means, for example. Accordingly, the counter holding means can be configured, for example, as a circumferentially completely closed ring or eyelet. However, the counter holding means can also be configured so as to be hook-shaped as has been defined above, or else ping-shaped.

The hook connection described above represents a pivoting mechanism of the load compartment cover for releasing and closing the load compartment access depending on an upward pivoting angle of the tailgate that is easy and cost-effective to implement. Moreover, the hook connection can be easily manually released in a non-destructive manner in order for the load compartment cover to be completely removed from the passenger cabin of the motor vehicle when required.

According to one further advantageous design embodiment of the invention, the hook-shaped holding means on the inside has a holding face having an Ω-shaped (omega-shaped) contour which in regions circumferentially surrounds an external side of the counter holding means that is engaged with the hook-shaped holding means. As has already been explained above, the hook-shaped holding means circumferentially is not completely closed but has a circumferential interruption by way of which the counter holding means can be brought to engage with the hook. In the context of the present invention an Ω-shaped contour of the holding face on the inside of the hook-shaped holding means is to be understood as such a contour which circumferentially surrounds the external side of the counter holding means that is engaged with the hook-shaped holding means by way of a circumferential angle of more than 180 degrees and less than 360 degrees. Accordingly, the direct spacing of the two free circumferential ends of the hook holding face, which delimit the circumferential interruption of the hook-shaped holding means, herein also referred to as the opening width, is smaller than the internal diameter of the contour of the inside holding face.

If an external diameter of the counter holding means that engages with the hook-shaped holding means is chosen such that said external diameter is larger than the opening width of the hook-shaped holding means and as large as or smaller than the internal diameter of the hook holding face contour, a specific resistance force has thus to be overcome in order for the counter holding means to be introduced into the hook so as to push the counter holding means through the opening width of the hook which is smaller than the external diameter of said counter holding means. The same applies for the reverse process i.e. when releasing the counter holding means from the hook-shaped holding means. It is to be understood that the hook-shaped holding means, in particular in the region of the circumferential ends of the holding face, must have a certain elasticity in order for the hook connection to be established and released in a non-destructive way, said elasticity permitting an at least brief, non-destructive, elastic widening of the opening width in order for the counter holding means to be passed through.

The design embodiment described above offers the advantage that a hook connection between the hook-shaped holding means and the counter holding means received by the latter, once established, can only be released by overcoming a specific resistance force, such that a secure, stable mounting of the load compartment cover on the tailgate is guaranteed under normal operating conditions, and the hook connection released only in the case of a force acting on the hook connection which overcomes the resistance force. A manual release of the hook connection is thus possible.

One even further advantageous design embodiment provides that a largest internal diameter of the holding face on the inside of the hook-shaped holding means has a size which corresponds to at least the size of an external diameter of the external side of the counter holding means that is capable of being engaged with the hook-shaped holding means. This ensures a smooth-running pivoting capability of the counter holding means in the hook-shaped holding means by way of minor friction losses.

According to one further advantageous design embodiment, the hook connection is configured in such a manner that the hook-shaped holding means in a upward pivoting movement of the tailgate holds the counter holding means in a form-fitting manner. In a downward pivoting movement of the tailgate that is counter to the upward pivoting movement, beyond a force of a predeterminable size which is counter to the downward pivoting movement and which acts on the load compartment cover, the hook-shaped holding means releases the counter holding means in a non-destructive manner.

The form-fitting holding of the counter holding means form-fitting by the hook in the upward pivoting of the tailgate in a rearward upward manner ensures that the load compartment cover is likewise moved conjointly with the tailgate in a rearward upward manner. The linkage of the region of the load compartment cover that is spaced apart from the pivot axis to the vehicle body herein, by way of the force transmission means, causes a pivoting of the load compartment cover toward the tailgate. As a result, the access to the load compartment of the motor vehicle is enlarged.

In the downward pivoting movement of the tailgate that is counter to the upward pivoting movement, that is to say in a closing procedure of the tailgate, the gravity acting on the load compartment cover can be advantageously utilized for moving the load compartment cover to the position thereof provided for covering the load compartment in the case of a completely closed tailgate, such that the interior of the load compartment cannot be seen from the outside in the case of a closed tailgate.

However, should an oversized object be located in the load compartment, which for example has been introduced into the load compartment after the opening of the tailgate, (e.g. an object of which the height protrudes beyond the originally provided vertical position of the load compartment cover in the closed state of the tailgate), the load compartment cover in the downward pivoting movement of the tailgate, for example by way of the front edge of said load compartment cover, will contact the oversized object such that the latter confronts a movement of the load compartment cover that follows the downward pivoting movement of the tailgate and impedes or blocks, respectively, said movement of the load compartment cover. Consequently, the load compartment cover in the further course of the closing movement of the tailgate can be jammed between the object and the tailgate. As a result of which the oversized object in the load compartment of the motor vehicle could be damaged by the compressive force exerted by the tailgate on the load compartment cover. However, this is effectively prevented, since the hook connection, as a result of the counterforce that is exerted by the oversized object on the load compartment cover and which is counter to the compressive force that is exerted by the tailgate on the load compartment cover, is released in a non-destructive manner such that the rear end region of the load compartment cover that faces the tailgate is no longer connected to the tailgate after the hook connection has been released, and said end region in the further course of the closing movement of the tailgate can freely move relative to the tailgate, for example can slide along the internal side of said tailgate.

According to one even further advantageous design embodiment, the hook-shaped holding means has a friction face which is spaced apart from an internal side of the tailgate. The counter holding means, after the release thereof by the hook-shaped holding means, slides and is guided along said friction face. This enables a targeted movement of the end region of the load compartment cover that faces the tailgate relative to the tailgate in the case described above in which an unexpected counterforce that is counter to the downward pivoting movement acts on the load compartment cover by way of a specific variable during the downward pivoting movement of the tailgate. The friction face which is spaced apart from the internal side of the tailgate significantly reduces the possibility of the end region of the load compartment cover that faces the tailgate in the movement of said end region relative to the tailgate engaging, for example, in a form-fitting manner with an element or component of the tailgate that projects from the internal side of the tailgate, the latter potentially leading to a sizeable, potentially damaging force acting from the tailgate by way of the load compartment cover on the oversized object.

BRIEF DESCRIPTION OF THE DRAWING FIGURES

Further features and advantages of the motor vehicle are derived from the description hereunder of exemplary embodiments which are not to be understood as limiting and which will be explained in more detail hereunder with reference to the drawing. In said drawing and in a schematic manner:

FIG. 5 shows a perspective view of the load compartment cover of the motor vehicle from FIG. 3;

FIG. 6 shows a plan view of the load compartment cover from FIG. 5;

FIG. 7 shows a partial view of a further exemplary embodiment of a load compartment cover;

FIG. 8 shows a perspective internal view of a rear lateral internal region of the motor vehicle from FIG. 1, in the case of a closed tailgate, having the load compartment cover from FIG. 7;

FIG. 9 shows an enlarged partial view from FIG. 8, which shows an exemplary embodiment of a linkage of a force transmission means to the load compartment cover;

FIG. 10 shows an enlarged partial view from FIG. 8, which shows an exemplary embodiment of a pivotable mounting of the load compartment cover on the tailgate;

FIG. 11 shows a perspective sectional view along the section line A-A shown in FIG. 10;

FIG. 12 shows a lateral sectional view through the load compartment of the motor vehicle from FIG. 8, along the central longitudinal plane of said motor vehicle, having an oversized object located in the load compartment;

FIG. 13 shows a lateral view of the pivotable mounting from FIG. 10;

FIG. 14 shows an enlarged partial view of the pivotable mounting from FIG. 13;

FIG. 17 shows a perspective internal view of a rear lateral internal region of the motor vehicle from FIG. 15, in the case of a closed tailgate;

FIG. 18 shows an enlarged partial view from FIG. 17, which shows a force transmission means and a force deflection means;

FIG. 19 shows a plan view of the load compartment cover from FIG. 5;

FIG. 20 shows an enlarged partial view from FIG. 19, which shows a further exemplary embodiment of the pivotable mounting of the load compartment cover on a tailgate;

FIG. 21 shows an enlarged partial view of the pivotable mounting from FIG. 20;

In the various figures, parts which in terms of the functions thereof are equivalent are at all times provided with the same reference signs such that said parts are typically also only described once.

DETAILED DESCRIPTION

Figure 1:
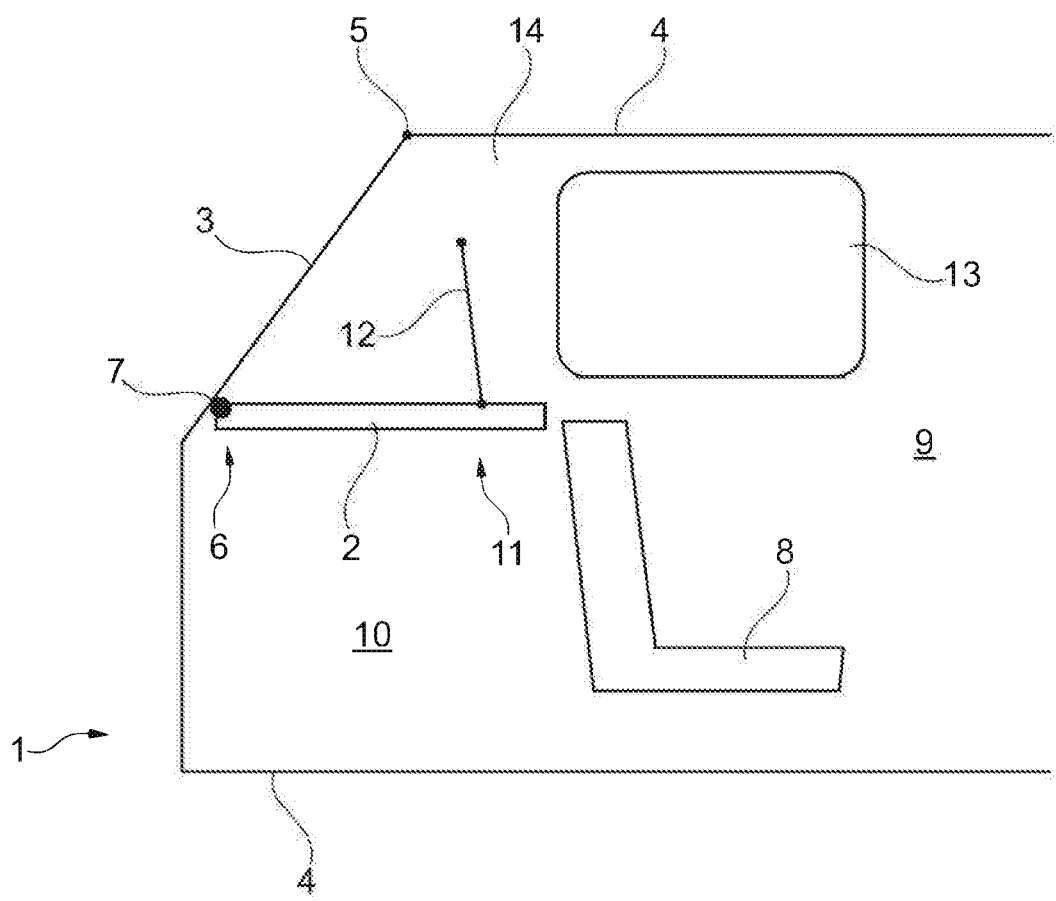
FIG. 1 shows a lateral sectional view of a rear region of an exemplary embodiment of a motor vehicle having a load compartment cover and a closed tailgate.

FIG. 1 schematically illustrates a lateral sectional view of a rear region of an exemplary embodiment of a motor vehicle 1 having a load compartment cover 2 and a closed tailgate 3. In particular, FIG. 1 illustrates a lateral sectional view through the motor vehicle 1 along the central longitudinal plane thereof (here corresponding to the drawing plane) onto the left vehicle side. The exemplary embodiment of the motor vehicle 1 shown here, in particular in the rear region thereof illustrated in FIG. 1, is constructed so as to be substantially symmetrical in relation to the central longitudinal plane of said motor vehicle 1, such that parts of the left vehicle side described hereunder are also provided and correspondingly disposed in an analogous manner on the right vehicle side of the motor vehicle 1 (not to be seen in FIG. 1).

Figure 2:
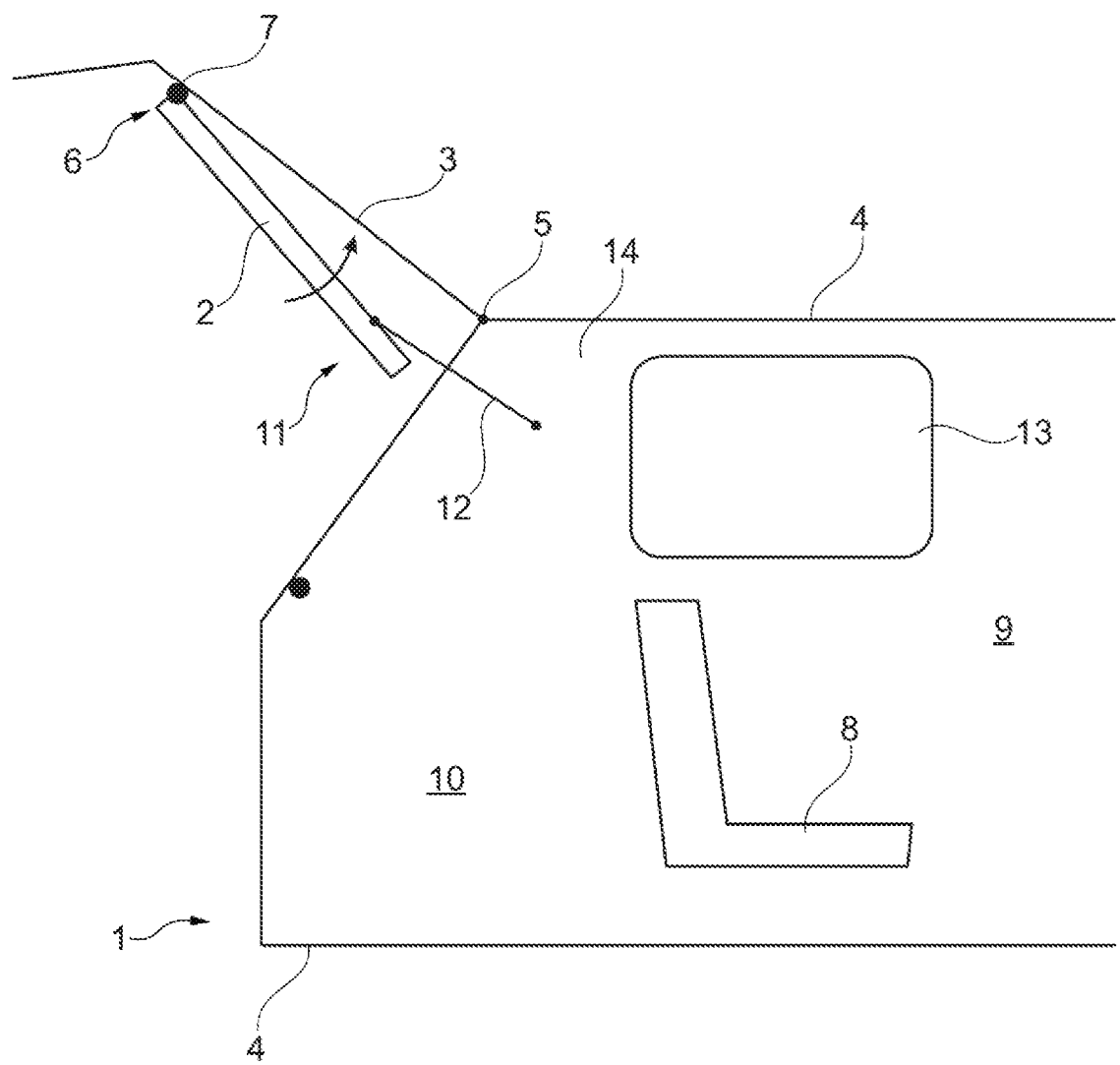
FIG. 2 shows a lateral sectional view of the rear region of the motor vehicle from FIG. 1, having an opened tailgate.

As can be derived from FIG. 1, the tailgate 3 is upwardly pivotable in a rearward upward manner about a tailgate pivot axis 5 that is established on a vehicle body 4, in particular on a roof region (cf. to this end also FIG. 2).

It can furthermore be seen in FIG. 1 that the load compartment cover 2, by way of the rear end region 6 thereof that faces the tailgate 3, is fastened to the tailgate 3 so as to be pivotable about a pivot axis 7. In the closed state of the tailgate 3 illustrated in FIG. 1, the load compartment cover 2 obscures an access to a load compartment 10 that is located within a passenger cabin 9 and lies behind a seat 8 of the motor vehicle 1. More particularly, the seat 8 here is a rear seat of the motor vehicle 1 which is disposed behind a front seat (not illustrated) of the motor vehicle 1. To this end, the load compartment cover 2 in the case of the state illustrated in FIG. 2 runs so as to be substantially horizontal between the rear end region 6 of said load compartment cover 2 that is held so as to be pivotable on the pivot axis 7, and a rearward upper edge of the seat backrest of the seat 8, to which a front end region 11 of the load compartment cover 2 that is spaced apart from the pivot axis 7 is contiguous.

It can furthermore be derived from FIG. 1 that the front end region 11 of the load compartment cover 2 is spaced apart from the pivot axis 7. The load compartment cover 2 is held on the vehicle body 4 by way of a force transmission element 12 in the form of a traction cable which in the force transmission direction is substantially non-elastic and transmits only tensile forces. In particular, the force transmission element 12 in the case of the motor vehicle 1 illustrated in FIG. 1 is linked and fastened to the vehicle body 4 on a vehicle pillar 14, here a C-pillar of the motor vehicle 1, which lies behind a window 13 and is directly ahead of the tailgate 3. It is to be understood that in the case of a presence of a D-pillar in a motor vehicle, said D-pillar in relation to a forward travel direction of the motor vehicle 1 being disposed behind the C-pillar and thus being directly ahead of the tailgate 3, the D-pillar is preferably used instead of the C-pillar as a linkage point of the force transmission element 12 on the vehicle body 4.

FIG. 2 illustrates the rear region of the motor vehicle 1 from FIG. 1, having an opened tailgate 3. As can be seen here, the tailgate 3 is in a state upwardly pivoted in a rearward upward manner about the tailgate pivot axis 5, wherein the load compartment cover 2 in the upward pivoting of the tailgate 3 on account of the force transmission element or the traction cable 12, respectively, is pivoted toward the tailgate 3 so as to expose the access to the load compartment 10 and is held in the illustrated state so as to provide a largest possible access to the load compartment

10. This is achieved in that the force transmission element 12, which in the force transmission direction is substantially non-elastic and consequently non-elongating in the force transmission direction, in the upward pivoting of the tailgate 3 pulls the load compartment cover 2 in a forward upward manner, on account of which the front end region 11 of the load compartment cover 2 is pivoted about the pivot axis 7 in the direction of the tailgate 3.

Since FIGS. 1 and 2 only illustrate the left vehicle side of the motor vehicle 1, but the motor vehicle 1, in particular in the rear region thereof illustrated, is constructed in a substantially symmetrical manner, it is to be understood that on the right vehicle side (not shown in FIGS. 1 and 2) a force transmission element 12 is likewise linked on the front end region 11 of the right side of the load compartment cover 2 and on the right-side vehicle body 4, in particular on the right C-pillar 14 of the motor vehicle 1.

Figure 3:
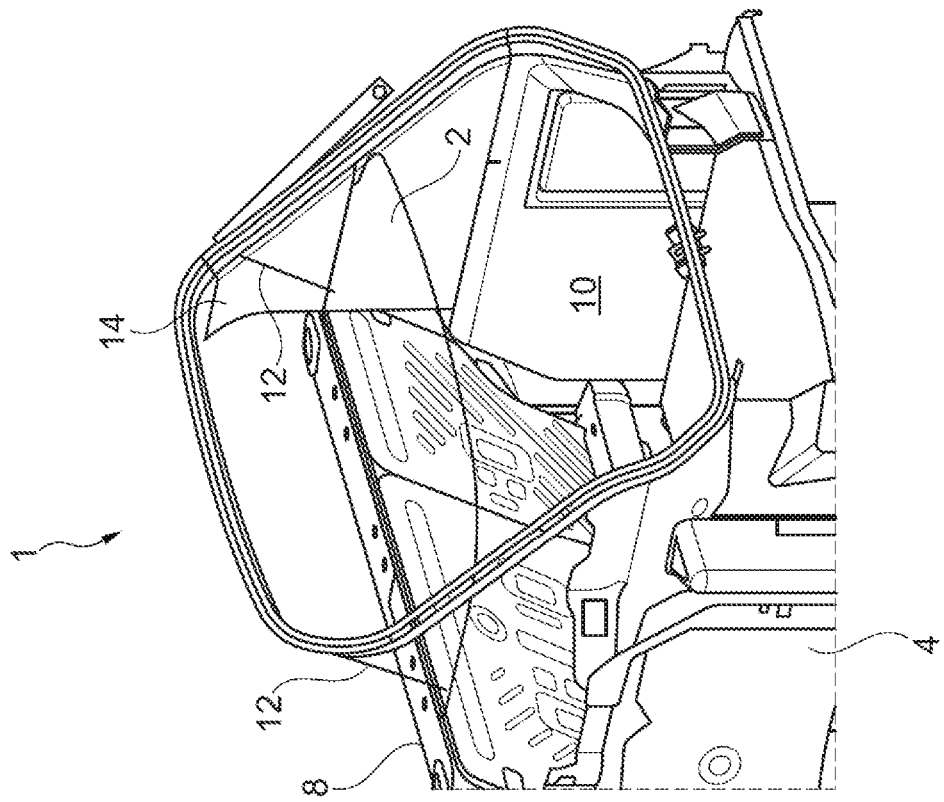
FIG. 3 shows a perspective view from the left rear of the rear region of the motor vehicle from FIG. 1, in the case of a closed tailgate.

FIG. 3 illustrates a perspective view from the rear left of the rear region of the motor vehicle 1 from FIG. 1, in the case of a closed tailgate 3, wherein the tailgate 3 is not to be seen in the view illustrated in FIG. 3 so as to provide a clear view of the load compartment cover 2 and the load compartment 10.

It can furthermore be seen in FIG. 3 that the motor vehicle 1 particularly advantageously does not have any lateral support bearings for the load compartment cover 2 which are usually attached to the vehicle body 4 and on which a usual load compartment cover would lie in the closed state of the tailgate 3. The position of the load compartment cover 2 of the motor vehicle 1 according to the invention is established only by the force transmission element 12 and the pivotable mounting on the tailgate 3. The access to the loading space 10 can be further enlarged by omitting the lateral support bearings for the load compartment cover 2. This moreover also applies to all exemplary embodiments of the motor vehicle that are yet to be described hereunder.

Figure 4:
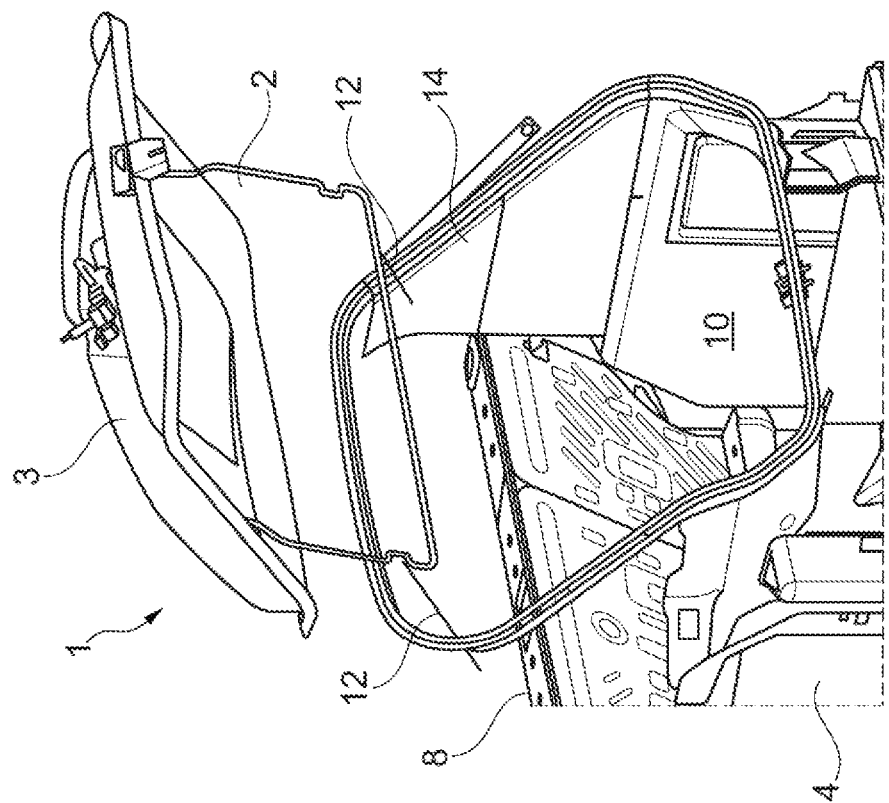
FIG. 4 shows a perspective view from the rear left of the rear region of the motor vehicle from FIG. 3, having an opened tailgate.

FIG. 4 illustrates a perspective view from the rear left of the rear region of the motor vehicle 1 from FIG. 3, having an opened tailgate.

FIG. 5 illustrates a perspective view of the load compartment cover 2 of the motor vehicle 1 from FIG. 3. FIG. 6 illustrates a plan view of said load compartment cover 2. As can be seen, the load compartment cover 2 is formed from a frame 15 which circumferentially surrounds the load compartment cover 2 and which can be made, for example, from an alloy or from a plastics material. The frame 15, in the exemplary embodiment illustrated of the load compartment cover 2, stretches a woven textile fabric 16 which forms the actual (storage or sight protection) face of the load compartment cover 2. In this way, the load compartment cover 2 can advantageously be produced so as to have a light weight and a minor installation space such that an assembly or disassembly, respectively, of the load compartment cover 2 on the motor vehicle 1 can be carried out without a great effort in terms of force and said load compartment cover 2 after disassembly moreover can be accommodated in a space-saving manner in the motor vehicle 1.

It can furthermore be derived from FIGS. 5 and 6 that the load compartment cover 2 in the rear end region 6 thereof that faces the tailgate 3 has two hook receivers or eyelet-shaped counter holding means 17 which are in each case capable of being hooked into a hook-shaped holding means (not illustrated here). Furthermore, the load compartment cover 2 in the front end region 11 thereof that is spaced apart from the rear end region 6 has two further holding means 18 to which in each case one of the force transmission element 12 is connectable. In the case of the load compartment cover 2, both the two rear counter holding means 17 as well as the two front holding means 18 are formed by a portion of the frame 15 that is not covered by the woven textile fabric 16 such that no additional components are to be provided therefor.

FIG. 7 illustrates a partial view of a further exemplary embodiment of a load compartment cover 19. The load compartment cover 19 likewise is able to be used instead of the load compartment cover 2 in all exemplary embodiments of motor vehicles described herein. The partial view illustrates a lateral part of the rear end region 6 of the load compartment cover 19.

The substantial difference in relation to the load compartment cover 2 illustrated in FIGS. 5 and 6 lies in that in the rear end region 6 of the load compartment cover 19 on both sides in each case one hook receiver or eyelet-shaped counter holding means 20, that is capable of being hooked into a hook-shaped holding means (not illustrated here), is provided, said counter holding means 20 in this case not being formed by the frame 15 per se but being able to be attached as a separate component to the frame 15. For example, the counter holding means 20 can be plug-fitted or clamped, or the like, to the frame 15 and/or be adhesively bonded to the latter. The advantage of this design embodiment is that no clearance has to be provided in the woven textile fabric 16 for providing the counter holding means 20 and the (storage or sight protection) face of the load compartment cover 19 can thus be completely closed. As is indicated in FIG. 7, the pivot axis 7 is established by the counter holding means 20.

While only one counter holding means 20 is shown in FIG. 7, it is to be understood that the second rear counter holding means 20 that is disposed on the opposite side (not illustrated) of the load compartment cover 19 can likewise be configured in this way. The two front holding means (not illustrated) for linking the force transmission element 12 can likewise be configured in this manner.

FIG. 8 illustrates a perspective internal view of a rear lateral internal region of the motor vehicle 1 from FIG. 1 in the case of a closed tailgate, having the load compartment cover 19 from FIG. 7. FIG. 9 illustrates an enlarged partial view from FIG. 8, which shows an exemplary embodiment of a linkage of the force transmission element 12 to the load compartment cover 19. FIG. 10 illustrates an enlarged partial view from FIG. 8, which shows an exemplary embodiment of a pivotable mounting of the load compartment cover 19 on the tailgate 3. FIG. 11 illustrates a perspective sectional view along the section line A-A shown in FIG. 10.

It can be seen in FIGS. 8 and 9 that the force transmission element 12 on the end on the load compartment cover has an Ω-shaped (omega-shaped) connection means 21 which is plug-fittable in a releasable manner directly on the frame 15 of the load compartment cover 19. A special holding means 18 such as is shown in the case of the load compartment cover 2 of FIGS. 5 and 6 is not required in the case of the load compartment cover 19. A second connection means 22 that is suitable for connecting to the vehicle body 4, or here to the C-pillar 14, respectively, is provided on that end of the force transmission element 12 that is opposite the Ω-shaped connection means 21.

As an alternative to the connection means 21 on the load compartment cover that is plug-fittable in the releasable manner on the frame 15 of the load compartment cover 19, said connection means 21 can also be non-releasably connected to the load compartment cover 19, for example be stitched to the woven textile fabric 16. The connection means 22 on the vehicle body can be releasably connected, for example by means of a hook connection or a clip connection, or else be non-releasably connected, to the vehicle body 4, here the C-pillar 14. In the case of the force transmission element 12 being non-releasably connected to the load compartment cover 19, the connection means 22 on the vehicle body is preferably releasably connected to the vehicle body 4 in order for an easy disassembly capability of the load compartment cover 19 from the motor vehicle 1 to be guaranteed.

The hook connection which establishes the pivot axis 7 and which pivotably connects the load compartment cover 19 to the tailgate 3 can be clearly seen in FIGS. 10 and 11. The hook connection has a hook or hook-shaped holding means 23 which in this example is fixedly connected to the tailgate 3 and with which the counter holding means 20 of the load compartment cover 19 can be brought to engage.

In particular, the hook-shaped holding means 23, in the case of the exemplary embodiment of the motor vehicle 1 shown, is configured and disposed in such a manner that said hook-shaped holding means 23 holds the counter holding means 20 of the load compartment cover 19 in the form-fitting manner in the upward pivoting movement of the tailgate 3 and in the downward pivoting movement of the tailgate 3 that is counter to the upward pivoting movement. Beyond a force of a predeterminable size which is counter to the downward pivoting movement and which acts on the load compartment cover 19, the hook-shaped holding means 23 releases the counter holding means 20 in a non-destructive manner.

As can be seen clearly in particular in FIG. 11, the hook-shaped holding means 23, in that region that can be brought to engage with the counter holding means 20 of the load compartment cover 19, is configured so as to be substantially J-shaped. The hook-shaped holding means 23 has a circumferential interruption 24 which is directed toward the tailgate 3. The counter holding means 20 of the load compartment cover 19 is introducible into the hook through the interruption 24, and is also releasable again from said hook in a non-destructive manner.

The configuration and arrangement of the hook-shaped holding means 23, in relation to the counter holding means 20 of the load compartment cover 19 shown in FIG. 11, has the effect that the hook of the holding means 23 in the upward pivoting movement of the tailgate 3 in a rearward upward manner forms a form-fitting pivotable connection to the counter holding means 20 of the load compartment cover 19.

FIG. 12 shows a lateral sectional view through the load compartment 10 of the motor vehicle 1 from FIG. 8 along the central longitudinal plane of said motor vehicle 1 (corresponding to the drawing plane) having an oversized object 25 located in the load compartment 10. Downward pivoting of the tailgate 3 to the closed position thereof, will cause the front edge of said load compartment cover 19 to impact the object 25. As a consequence, the load compartment cover 19 can be jammed between the object 25 and the internal side of the tailgate 3 which could lead to damage to the object 25.

If the movement of the load compartment cover 19 in the downward pivoting of the tailgate 3 is now blocked, as by the oversized object 25 here, the counter force F exerted herein by the object 25 on the load compartment cover 19 (cf. FIG. 13) leads to the counter holding means 20 of the load compartment cover 19, on account of the circumferential interruption 24 of the hook-shaped holding means 23, being released in a non-destructive manner from the form-fitting engagement with the holding means 23. This can be readily seen in FIG. 13 in a lateral view of the hook-shaped holding means 23 from FIG. 10. In order for any potential jamming of the load compartment cover 19 on the internal side of the tailgate 3 herein to be reliably prevented, the hook-shaped holding means 23 additionally has a friction face 26 which is spaced apart from an internal side of the tailgate 3. The counter holding means 20 of the load compartment cover 19 after the release thereof by the hook-shaped holding means 23 slides and is guided along said friction face.

FIG. 14 illustrates an enlarged partial view of the pivotable mounting from FIG. 13, just after the release of the engagement of the counter holding means 20 of the load compartment cover 19 from the hook-shaped holding means 23. It can be seen in FIG. 14 that the hook-shaped holding means 23 has a holding face on the inside having an Ω-shaped contour which in regions circumferentially surrounds an external side of the counter holding means 20 that are engaged with the hook-shaped holding means 23. A largest internal diameter Di of the holding face on the inside of the hook-shaped holding means 23 has a size which corresponds to at least the size of an external diameter Da of the external side of the counter holding means that can be brought to engage with the hook-shaped holding means 23 (Di≥Da). It can furthermore be seen that the direct spacing of the ends that delimit the circumferential interruption 24 of the hook-shaped holding means 23 (=opening width W) is smaller than the internal diameter Di of the Ω-shaped contour of the holding face on the inside of the holding means 23. The amount of a resistance force that has to be overcome in order for the counter holding means 20 to be released from the form-fitting engagement with the hook-shaped holding means 23 can be set by way of the difference between the opening width W and the internal diameter Di, as is shown in FIG. 13, for example.

Figure 15:
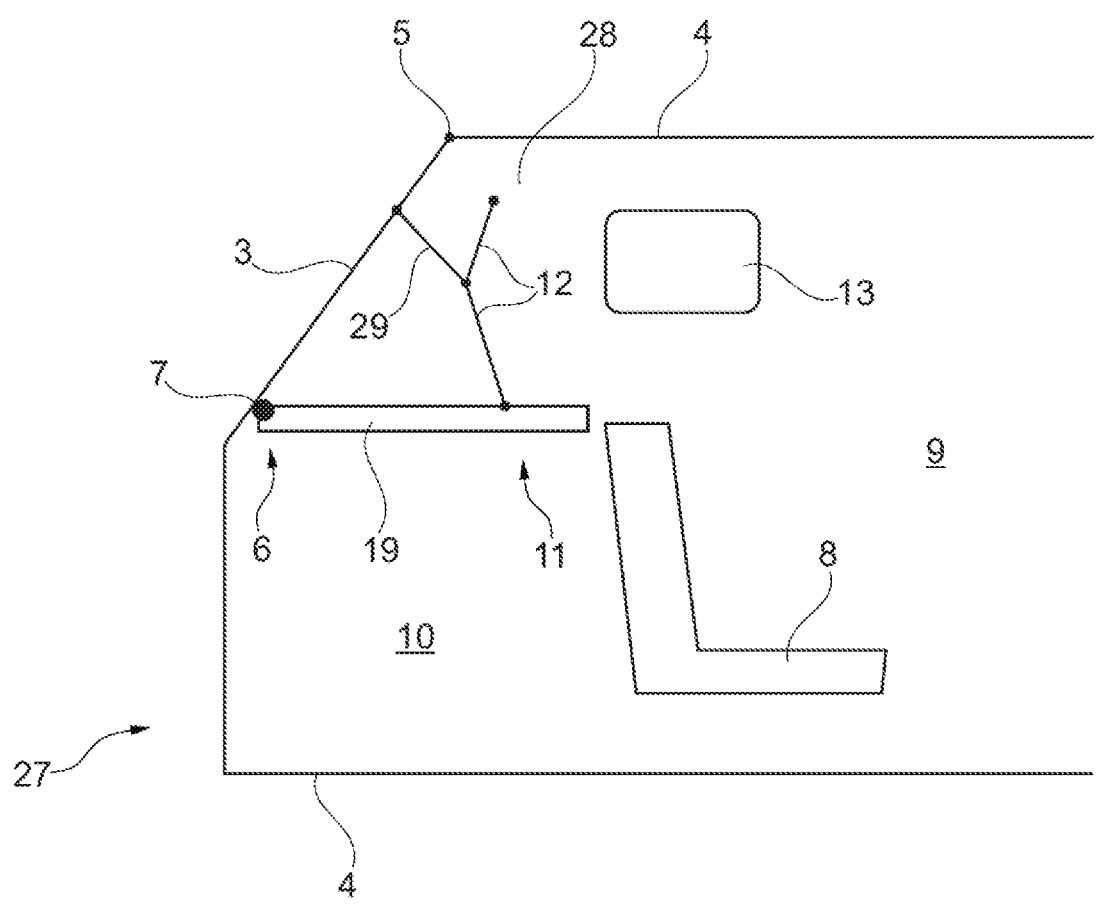
FIG. 15 shows a lateral sectional view of a rear region of a further exemplary embodiment of a motor vehicle having a load compartment cover and a closed tailgate.

FIG. 15 illustrates a lateral sectional view of a rear region of a further exemplary embodiment of a motor vehicle 27 having a load compartment cover 19 and a closed tailgate 3. FIG. 15 illustrates in particular a lateral sectional view through the motor vehicle 27 along the central longitudinal plane thereof (here corresponding to the drawing plane) onto the left vehicle side. The exemplary embodiment of the motor vehicle 27 shown, in particular in the rear region thereof shown in FIG. 15, is constructed so as to be substantially symmetrical in relation to the central longitudinal plane of said motor vehicle 27. Thus, parts of the left vehicle side described hereunder are also provided and correspondingly disposed in an analogous manner on the right vehicle side of the motor vehicle 27 (not to be seen in FIG. 27).

Figure 16:
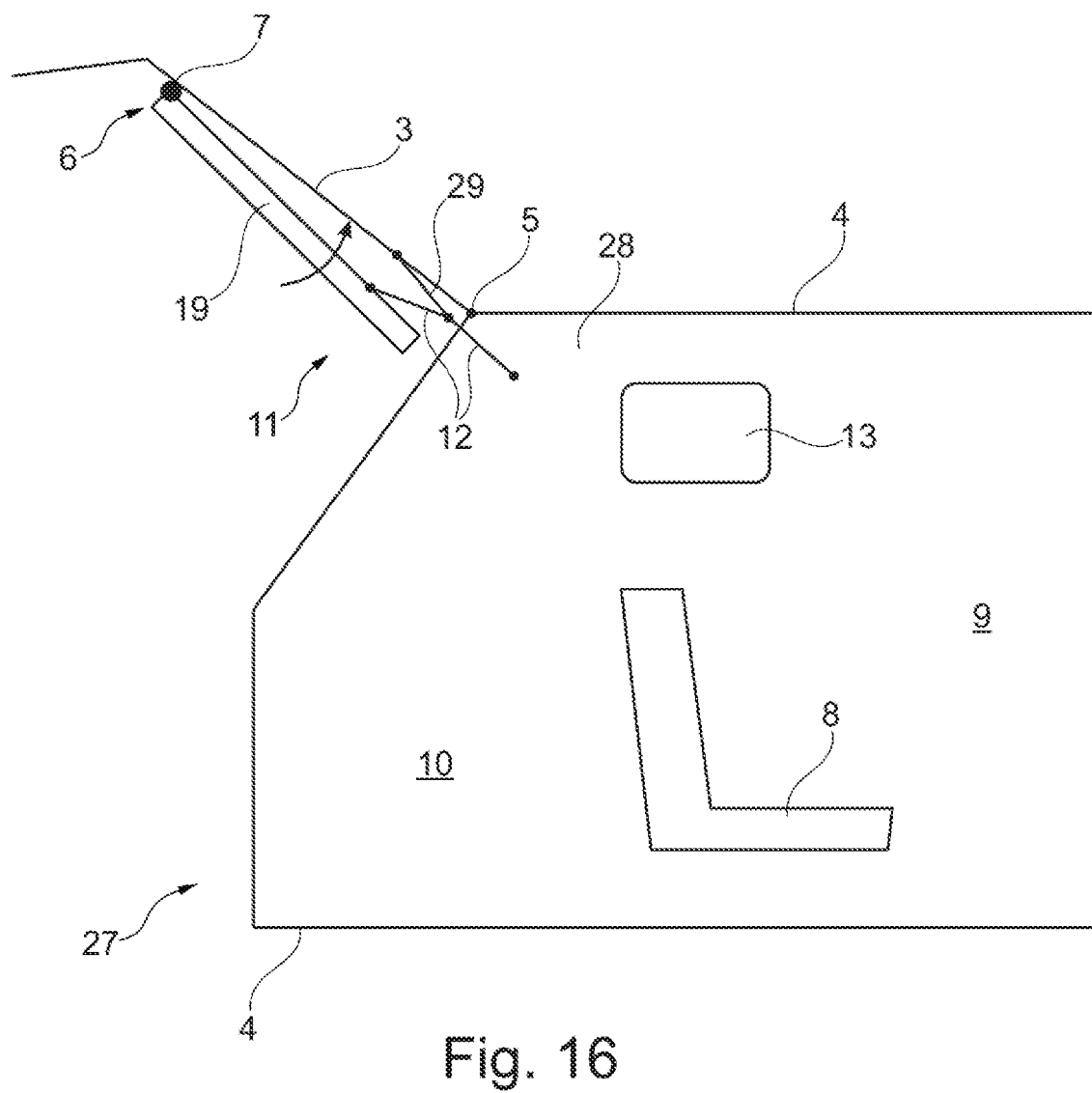
FIG. 16 shows a lateral sectional view of the rear region of the motor vehicle from FIG. 15, having an opened tailgate.

As can be derived from FIG. 15, the tailgate 3 is pivotable in a rearward upward manner about a tailgate pivot axis 5 that is established on a vehicle body 4, in particular on a roof region (cf. to this end also FIG. 16).

It can furthermore be seen in FIG. 15 that the load compartment cover 19, by way of the rear end region 6 thereof that faces the tailgate 3, is fastened to the tailgate 3 so as to be pivotable about a pivot axis 7. In the closed state of the tailgate 3 illustrated in FIG. 15, the load compartment cover 19 obscures an access to a load compartment 10 that is located within a passenger cabin 9 and lies behind a seat 8 of the motor vehicle 27. That seat 8 is a rear seat of the motor vehicle 27 which is disposed behind a front seat (not illustrated) of the motor vehicle 27. To this end, the load compartment cover 19 in the case of the state illustrated in FIG. 15 runs so as to be substantially horizontal between the rear end region 6 of said load compartment cover 19 that is held so as to be pivotable on the pivot axis 7, and a rearward upper edge of the seat backrest of the seat 8, to which a front end region 11 of the load compartment cover 19 that is spaced apart from the pivot axis 7 is contiguous.

It can furthermore be derived from FIG. 15 that the load compartment cover 19 is spaced apart from the pivot axis 7. Further, the load compartment cover 19 is held on the vehicle body 4 by way of a force transmission element 12 in the form of a traction cable which in the force transmission direction is substantially non-elastic and transmits only tensile forces. In particular, the force transmission element 12 in the case of the motor vehicle 27 illustrated in FIG. 15 is linked and fastened to the vehicle body 4 on a vehicle pillar 28, here a D-pillar of the motor vehicle 27, which lies behind a window 13 and is directly ahead of the tailgate 3. It is to be understood that in the case of a presence of just one C-pillar which is directly ahead of the tailgate 3 in a motor vehicle, said C-pillar is preferably used instead of the D-pillar 28 as a linkage point of the force transmission element 12 on the vehicle body 4.

In contrast to the motor vehicle 1 illustrated in FIGS. 1 and 2, the force transmission element 12 is additionally deflected on a force deflection feature or means 29 that is attached to the tailgate 3. In the case of the exemplary embodiment of the motor vehicle 27 illustrated, the force transmission element 12 is a traction cable and the force deflection feature or means 29 is a deflection traction cable that is fastened to the force transmission element 12 and runs obliquely or transversely to the force transmission element 12.

FIG. 16 illustrates the rear region of the motor vehicle 27 from FIG. 15, having an opened tailgate 3. As can be seen here, the tailgate 3 is in a state upwardly pivoted in a rearward upward manner about the tailgate pivot axis 5. The load compartment cover 19, upon the upward pivoting of the tailgate 3 on account of the force transmission means or the traction cable 12, is pivoted toward the tailgate 3 and held in the state illustrated so as to expose the access to the load compartment 10. In the upward pivoting of the tailgate 3 the force deflection feature or means 29 has the effect that the force transmission element 12 in the opened position of the tailgate 3 is pulled further upward. As a result, the load compartment cover 19 is likewise pivoted further about the pivot axis 7 in the direction toward the tailgate 3. On account thereof, a largest possible access to the load compartment 10 is provided. This is additionally facilitated in that the force transmission element 12, and the force deflection feature or means 29, upon the upward pivoting of the tailgate 3, pulls the load compartment cover 19 in a forward upward manner. As a result, the front end region 11 of the load compartment cover 19 is pivoted about the pivot axis 7 in the direction of the tailgate 3.

Since FIGS. 15 and 16 only illustrate the left vehicle side of the motor vehicle 27, but the motor vehicle 27, in particular in the rear region thereof illustrated, is constructed in a substantially symmetrical manner, it is to be understood that a force transmission element 12 is likewise linked on the front end region 11 of the right side of the load compartment cover 19 and on the right-side vehicle body 4 on the right vehicle side of the motor vehicle 27 not shown in FIGS. 15 and 16, in particular on the right D-pillar 28 of the motor vehicle 27. As a result, the force transmission element 12 is likewise deflected by a force deflection means 29 that is attached to the right vehicle side of the tailgate 3.

FIG. 17 illustrates a perspective internal view of a rear lateral internal region of the motor vehicle 27 from FIG. 15, in the case of a closed tailgate. The force transmission element 12 on the end on the load compartment cover has an $\Omega$-shaped (omega-shaped) connection means 21 which is plug-fittable in a releasable manner directly on the frame 15 of the load compartment cover 19. A special holding means 18, such as is shown in the case of the load compartment cover 2 of FIGS. 5 and 6, is not required in the case of the load compartment cover 19. A second connection means 22 that is suitable for connecting to the vehicle body 4, or here to the D-pillar 28, respectively, is provided on that end of the force transmission element 12 that is opposite the $\Omega$-shaped connection means 21.

As an alternative to the connection means 21 (shown in FIG. 17), the connection means 21 can also be non-releasably connected to the load compartment cover 19, for example be stitched to the woven textile fabric 16. The connection means 22 on the vehicle body can be releasably connected, for example by means of a hook connection or a clip connection, or else be non-releasably connected, to the vehicle body 4, here the D-pillar 28. In the case of the force transmission element 12 being non-releasably connected to the load compartment cover 19, the connection means 22 on the vehicle body is preferably releasably connected to the vehicle body 4 in order for an easy disassembly capability of the load compartment cover 19 from the motor vehicle 27 to be guaranteed.

FIG. 18 illustrates an enlarged partial view from FIG. 17, which shows the force transmission element 12 and the force deflection feature or means 29. The fastening of the force deflection feature or means 29 to the force transmission element 12 can be performed in a releasable manner, for example by means of a plug connection, a clamp connection, or a clip connection or in a non-reasonable manner, for example by stitching onto the force transmission element 12. As is furthermore shown in FIG. 18, a connection means 30 of the force deflection feature or means 29 on the tailgate can be configured in a manner similar to that of the connection means 22 of the force transmission element 12 on the vehicle body. Thus, the force deflection feature or means 29 can be releasably or non-releasably fastened to the tailgate 3 by means of a hook connection or clip connection, for example.

FIG. 19 illustrates a plan view of the load compartment cover 2 from FIG. 5, and FIG. 20 illustrates an enlarged partial view from FIG. 19, which shows a further exemplary embodiment of a pivotable mounting of the load compartment cover 2 on a tailgate 3.

In particular, it can be derived from FIG. 20 that the pivotable mounting of the load compartment cover 2 on the tailgate 3 has at least one hook connection which connects the tailgate 3 to the load compartment cover 2 and establishes the pivot axis 7. That at least one hook connection has a hook or hook-shaped holding means 31 that is fixedly connected to the tailgate 3 and the hook receiver or counter holding means 17 which can be brought to engage with said hook-shaped holding means 31.

As can be clearly seen in particular in FIG. 20, the hook-shaped holding means 31 is configured so as to be substantially U-shaped and has a circumferential interruption 24 which is directed toward the load compartment cover 2. The counter holding means 17 of the load compartment cover 2, on account of the interruption 24, is insertable into the hook and also releasable therefrom again in a non-destructive manner.

FIG. 21 illustrates an enlarged partial view of the pivotable mounting from FIG. 20. It can be seen in FIG. 21 that the hook-shaped holding means 31 has a holding face on the inside having an $\Omega$-shaped contour which in regions circumferentially surrounds an external side of the counter holding means 17 that can be brought to engage with the hook-shaped holding means 31. A largest internal diameter Di of the holding face on the inside of the hook-shaped holding means 31 has a size which corresponds to at least the size of an external diameter Da of the external side of the counter holding means 17 that can be brought to engage with the hook-shaped holding means 31 (Di≥Da). It can furthermore be seen that the direct spacing of the ends that delimit the circumferential interruption 24 of the hook-shaped holding means 31 (=opening width W) is smaller than the internal diameter Di of the Ω-shaped contour of the holding face on the inside of the holding means 31. The amount of a resistance force that has to be overcome in order for the counter holding means 17 of the load compartment cover 2 to be released from the form-fitting engagement with the hook-shaped holding means 31 can be set by way of the difference between the opening width W and the internal diameter Di.

Figure 22:
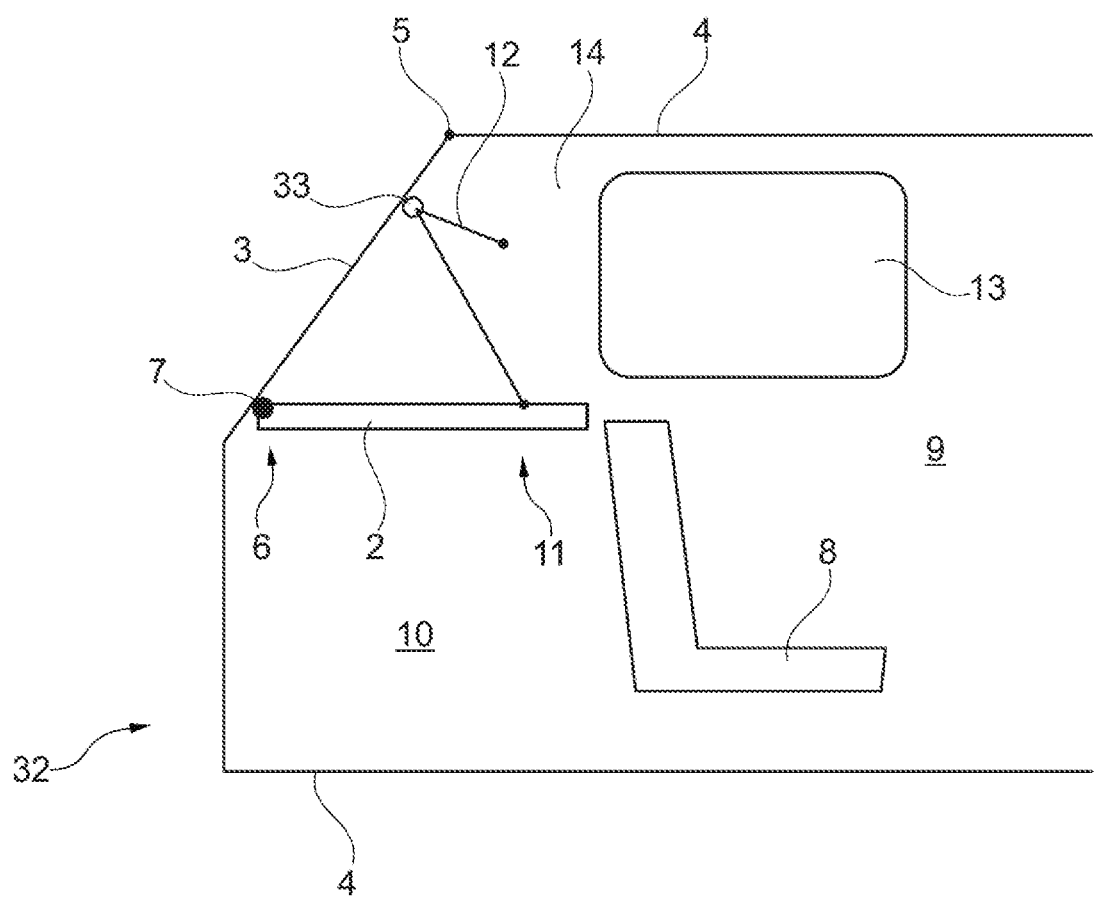
FIG. 22 shows a lateral sectional view of a rear region of a further exemplary embodiment of a motor vehicle having a load compartment cover and a closed tailgate.

FIG. 22 schematically illustrates a lateral sectional view of a rear region of an even further exemplary embodiment of a motor vehicle 32 having a load compartment cover 2 and a closed tailgate 3. In particular, FIG. 22 illustrates a schematic lateral sectional view through the motor vehicle 32 along the central longitudinal plane thereof (here corresponding to the drawing plane). Accordingly, that part that in relation to the forward travel direction is the left vehicle side is illustrated in FIG. 22. The exemplary embodiment of the motor vehicle 32 shown here, in particular in the rear region thereof illustrated, is constructed so as to be substantially symmetrical in relation to the central longitudinal plane such that parts of the left vehicle side described hereunder are also provided and correspondingly disposed in an analogous manner on the right vehicle side (not to be seen in FIG. 22).

Figure 23:
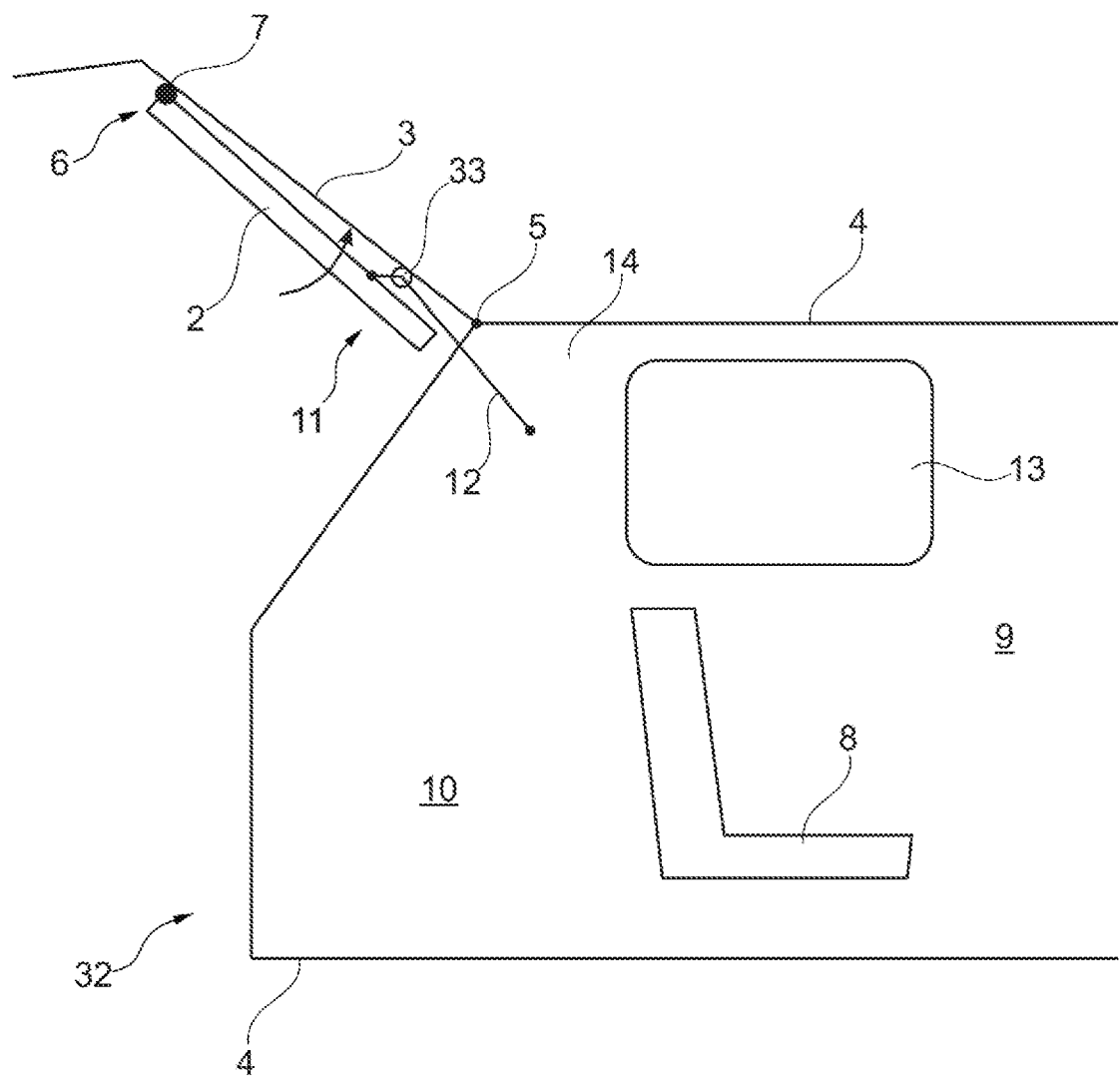
FIG. 23 shows the rear region of the motor vehicle from FIG. 22, having an opened tailgate.

As can be derived from FIG. 22, the tailgate 3 is upwardly pivotable in a rearward upward manner about a tailgate pivot axis 5 that is established on a vehicle body 4, in particular on a roof region (cf. to this end also FIG. 23).

It can furthermore be seen in FIG. 22 that the load compartment cover 2 by way of the rear end region 6 thereof is fastened to the tailgate 3 so as to be pivotable about a pivot axis 7. In the closed state of the tailgate 3 illustrated in FIG. 22, the load compartment cover 2 obscures an access to a load compartment 10 that is located within a passenger cabin 9 and lies behind a seat 8 of the motor vehicle 32. The seat 8 here is a rear seat of the motor vehicle 32 which is disposed behind a front seat (not illustrated) of the motor vehicle 32. To this end, the load compartment cover 2 in the case of the state illustrated in FIG. 22 runs so as to be substantially horizontal between the rear end region 6 of said load compartment cover 2 that is held so as to be pivotable on the pivot axis 7, and a rearward upper edge of the seat backrest of the seat 8, to which a front end region 11 of the load compartment cover 2 is contiguous.

It can furthermore be derived from FIG. 22 that the load compartment cover 2 is held on the vehicle body 4 by way of a force transmission element 12 in the form of a traction cable which in the force transmission direction is substantially non-elastic and transmits only tensile forces. In particular, the force transmission element 12 in the case of the motor vehicle 32 illustrated in FIG. 22 is linked and fastened to the vehicle body 4 on a vehicle pillar 14, here a C-pillar of the motor vehicle 32, which lies behind a window 13 and is directly ahead of the tailgate.

A force deflection feature or means 33 which deflects the force transmission element 12 and which is disposed on and attached to the tailgate 3 can furthermore be seen in FIG. 22. The force deflection feature or means 33 can be configured as an eyelet or as a deflection roller, for example.

FIG. 23 illustrates the rear region of the motor vehicle 32 from FIG. 22, having an opened tailgate 3. As can be seen here, the tailgate 3 is in a state upwardly pivoted in a rearward upward manner about the tailgate pivot axis 5, wherein the load compartment cover 2 in the upward pivoting of the tailgate 3 on account of the force transmission means or the traction cable 12, respectively, is pivoted so as to expose the access to the load compartment 10 and is held in the illustrated state. In order for a largest possible access to the load compartment 10 to be guaranteed, the load compartment cover 2 in the case of a completely opened tailgate 3, is disposed so as to be substantially completely parallel with the tailgate 3 (See FIG. 23). This is achieved in that the spacing between the force deflection feature or means 33 in the closed state of the tailgate 3 illustrated in FIG. 22 and the linkage point of the force transmission element 12 in the front end region 11 of the load compartment cover 2 corresponds to approximately the pivoting distance of the force deflection feature or means 33 when the tailgate 3 is upwardly pivoted. As a result, the upward pivoting movement of the tailgate 3 and of the displacement of the force deflection feature or means 33 pulls the force transmission element 12, which in the force transmission direction is substantially non-elastic and consequently non-elongating in the force transmission direction, in an upward manner. As a result, the front end region 11 of the load compartment cover 2 is pivoted about the pivot axis 7 in the direction of the tailgate 3.

Since FIGS. 22 and 23 only illustrate the left vehicle side of the motor vehicle 32, but the motor vehicle 32, in particular in the rear region thereof illustrated, is constructed in a substantially symmetrical manner, it is to be understood that a force transmission element 12 is likewise linked on the front end region 11 of the right side of the load compartment cover 19 and on the right-side vehicle body 4 on the right vehicle side not shown in FIGS. 22 and 23, in particular on the right C-pillar 14 of the motor vehicle 32, and that the force transmission element 12 is likewise deflected by a force deflection means 33 that is attached to the right vehicle side of the tailgate 3.

Figure 24:
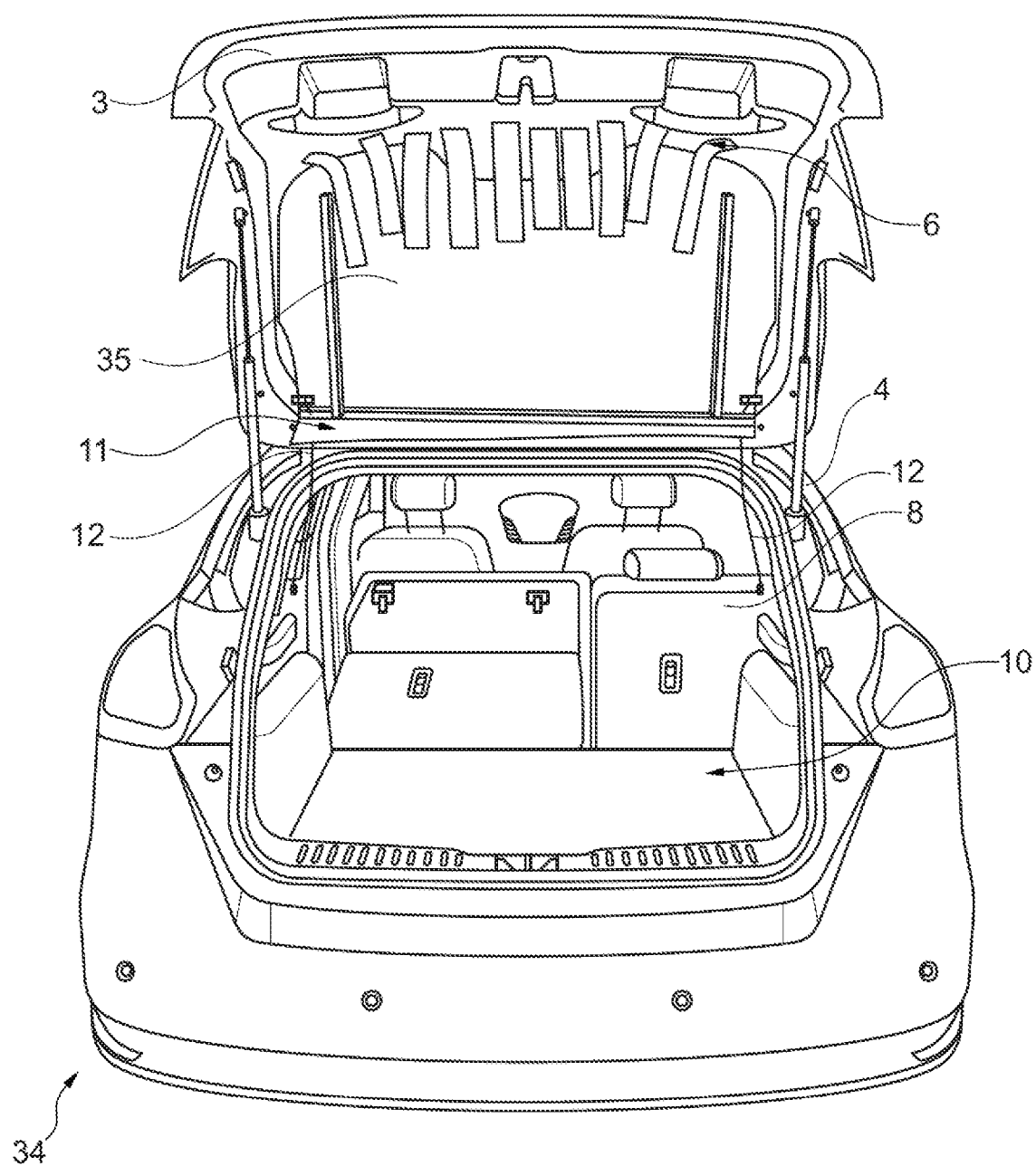
FIG. 24 shows a rearward region of a further exemplary embodiment of a motor vehicle having a load compartment cover and an opened tailgate.

FIG. 24 illustrates a rear region of a further exemplary embodiment of a motor vehicle 32 having a load compartment cover 35 and an opened tailgate 3. The force transmission element 12 which here are likewise configured as substantially inelastic traction cables can be seen on both sides of the load compartment cover 35 in FIG. 24.

Figure 25:
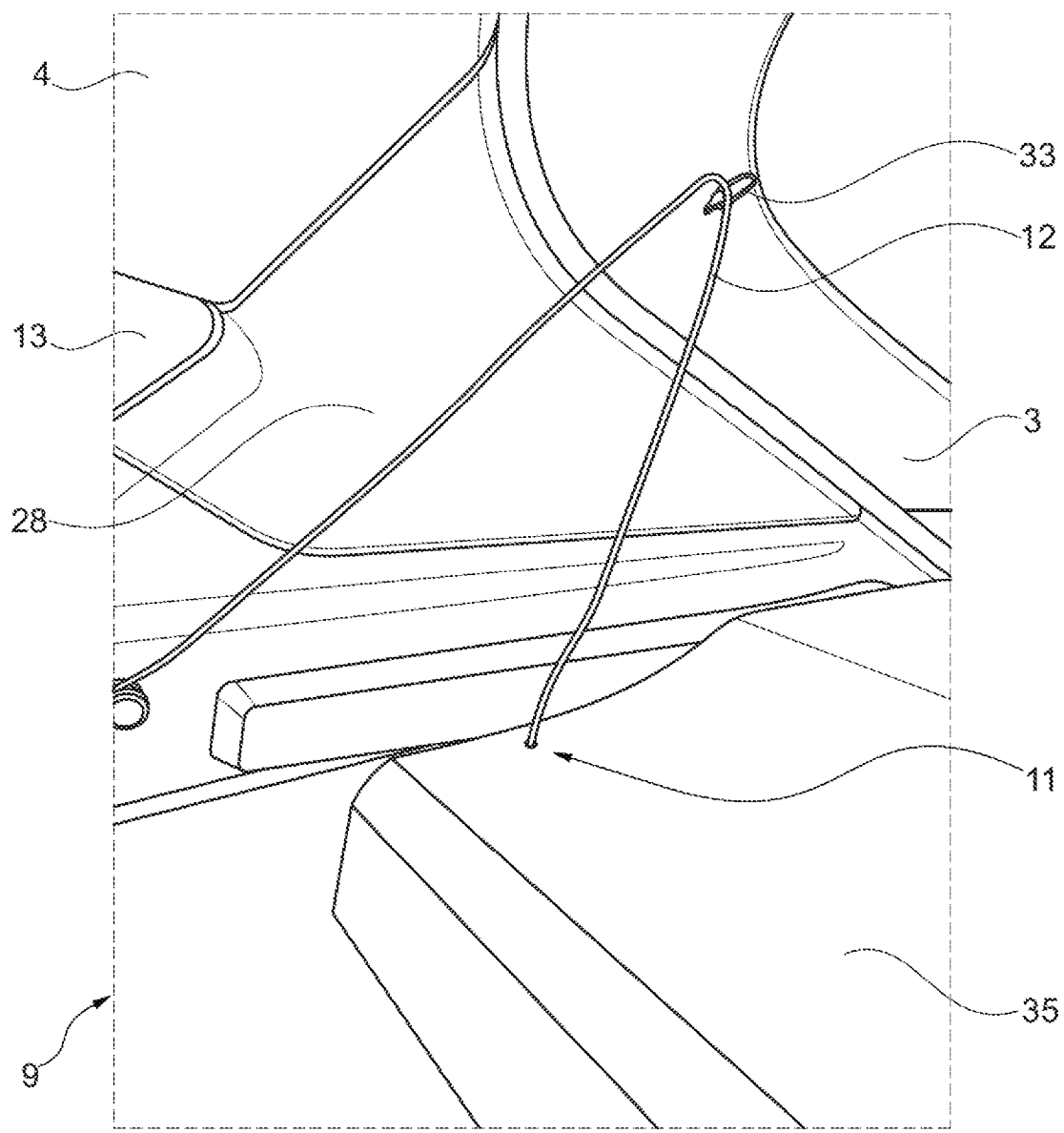
FIG. 25 shows a lateral internal view of a right vehicle side of the motor vehicle from FIG. 24, in the case of a closed tailgate.

FIG. 25 illustrates a lateral internal view of the right vehicle side of the motor vehicle 34 from FIG. 24, having a closed tailgate 3. It can be clearly seen that the force transmission element 12 at one end is linked on the front end region 11 of the load compartment cover 35, and at the other end is fastened to the vehicle body 4. In the case of the exemplary embodiment of the motor vehicle 34 illustrated here, the linkage of the force transmission element 12 on the vehicle body is performed on a D-pillar 28 of the motor vehicle 34 that is directly ahead of the tailgate 3. See also FIG. 26 which illustrates a detailed view of the rear right region of the motor vehicle 34 from FIG. 24, having an opened tailgate 3, and of the additionally visible C-pillar 14 of the motor vehicle 34.

Figure 26:
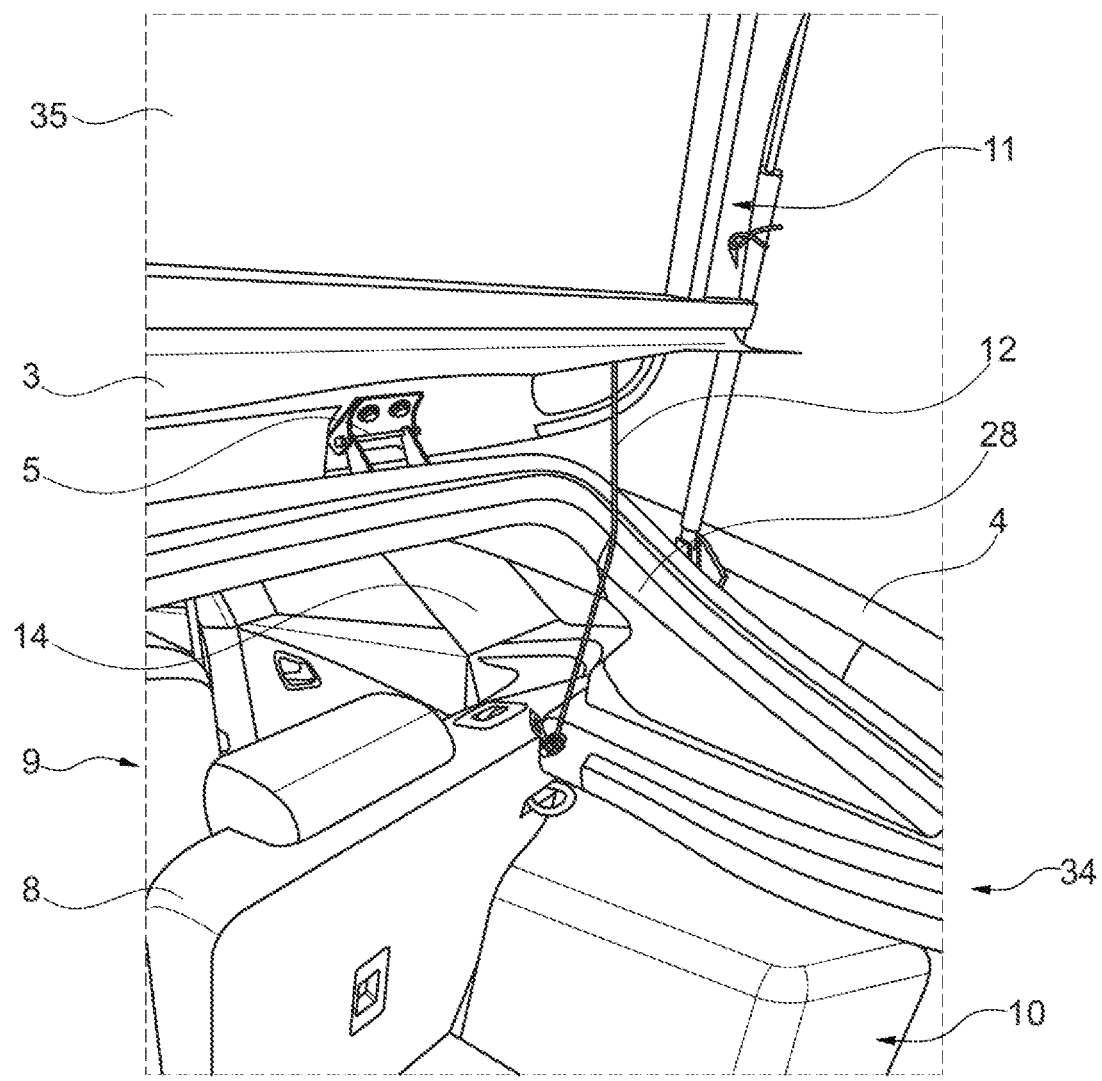
FIG. 26 shows a detailed view of the rearward right region of the motor vehicle from FIG. 24, in the case of an opened tailgate.

It can furthermore be clearly derived from FIGS. 25 and 26 that the force transmission element 12 and the force deflection feature or means 33, in the case of the exemplary embodiment of the motor vehicle 34 illustrated, are disposed in the passenger cabin 9 and are also accessible from the latter.

Particularly preferably, the load compartment cover 35 is releasably fastened to the tailgate 3, and the force transmission element 12 is releasably fastened to the load compartment cover 35 and/or releasably fastened to the vehicle body 4.

The above-described motor vehicle is not limited to the embodiments disclosed herein, but also comprises functionally equivalent embodiments which are derived from technically purposeful further combinations of the features described herein.

What is claimed:

1. A motor vehicle, comprising:
   a vehicle body;
   a load compartment in the vehicle body;
   a tailgate carried on the vehicle body; and
   a load compartment cover connected to the tailgate by at least one hook connection defining a pivot axis and connected to the vehicle body forward of the pivot axis by at least one force transmission element whereby (a) when the tailgate is pivoted upward, the load compartment cover pivots toward the tailgate so as to expose an access to the load compartment and (b) when the tailgate is pivoted downward and a force beyond a predetermined size and counter to downward pivoting movement acts upon the load compartment cover, the at least one hook connection is released in a non-destructive manner.

2. The motor vehicle of claim 1 wherein the at least one hook connection includes a hook and a hook receiver wherein the hook (a) holds the hook receiver in a form fitting manner when the tailgate is pivoted upward and (b) releases the hook receiver in said non-destructive manner when the tailgate is pivoted downward and the force beyond the predetermined size and counter to the downward pivoting movement acts upon the load compartment cover.

3. The motor vehicle as claimed in claim 2, wherein the hook has a friction face that is spaced from an internal side of the tailgate and the hook receiver after the release thereof by the hook slides and is guided along said friction face.

4. The motor vehicle as claimed in claim 3, wherein the hook on an inside has a holding face having an Ω-shaped contour that in regions circumferentially surrounds an external side of the hook receiver.

5. The motor vehicle as claimed in claim 4, wherein a largest internal diameter of the holding face on the inside of the hook has a first size which corresponds to at least a second size of an external diameter of the external side of the hook receiver.

6. The motor vehicle as claimed in claim 5, wherein a linkage of the force transmission element to the vehicle body is located on a vehicle pillar that is forward of the tailgate.

7. The motor vehicle as claimed in claim 6, wherein the force transmission element is a traction cable.

8. The motor vehicle as claimed claim 7, wherein the force transmission element is deflected on a force deflection feature that is attached to the tailgate.

9. The motor vehicle as claimed in claim 8, wherein the force deflection feature is an eyelet, a deflection roller, or a deflection traction cable.

10. The motor vehicle as claimed in claim 8, wherein the force transmission element is said traction cable and the force deflection feature is a deflection traction cable that is fastened to the force transmission element and runs obliquely or transversely to the force transmission element.

11. The motor vehicle as claimed in claim 10, wherein the hook is carried on the tailgate and the hook receiver is carried on the load compartment cover.

\* \* \* \* \*